United States Patent [19]

Ashby et al.

[11] 3,884,494
[45] May 20, 1975

[54] APPARATUS FOR TRANSPORTING HOUSE STRUCTURES OR THE LIKE

[76] Inventors: Harrell Dean Ashby; Ivan V. Ashby, both of Rt. 2, Box 20A, Edmond, Okla. 73034

[22] Filed: Dec. 13, 1972

[21] Appl. No.: 314,806

[52] U.S. Cl.............. 280/81 B; 52/143; 214/512; 280/43.23; 280/415 B
[51] Int. Cl............................................. B60p 1/02
[58] Field of Search............ 280/81 R, 43.23, 87 B, 280/415 B, 438 R; 254/86 H

[56] References Cited
UNITED STATES PATENTS

| | | | |
|---|---|---|---|
| 1,747,580 | 2/1930 | Fageol | 280/81 B |
| 2,008,344 | 7/1935 | Wilhelm | 280/87 B |
| 2,115,328 | 4/1938 | DeCole et al. | 254/86 H |
| 2,150,701 | 3/1939 | Reid | 254/86 H |
| 2,475,443 | 7/1949 | Bill | 280/43.23 |
| 2,751,234 | 6/1956 | Couse | 280/415 B |
| 2,979,341 | 4/1961 | Thomas | 280/438 R |
| 3,288,436 | 11/1966 | Silva | 254/86 H |
| 3,429,585 | 2/1969 | Ross | 280/43.23 |
| 3,633,776 | 1/1972 | Moore | 280/43.23 |

*Primary Examiner*—Albert J. Makay
*Assistant Examiner*—Ross Weaver
*Attorney, Agent, or Firm*—Dunlap & Codding

[57] ABSTRACT

An improved trailer apparatus for transporting house structures or the like having a support beam assembly connected to a trailer fifth wheel assembly for raising, lowering, and supporting the house structure. The trailer apparatus includes a rearward beam elevation assembly raising and lowering the rearward end portion of the support beam assembly and a road dolly assembly removably connectable to the support beam assembly rollingly supporting the rearward end portion of the support beam assembly when connected thereto, the rearward end portion of the support beam assembly being supported via a plant dolly assembly in one assembled position of the trailer apparatus.

28 Claims, 20 Drawing Figures

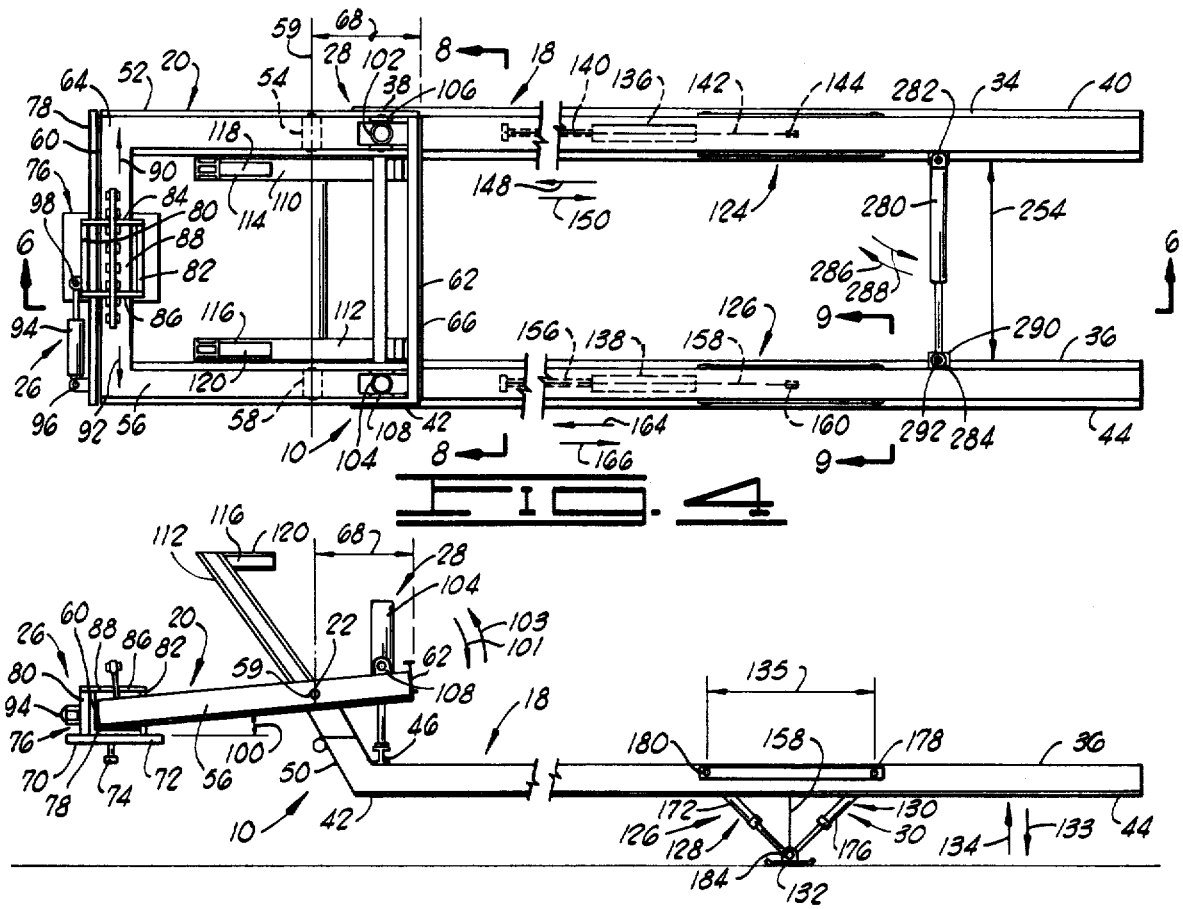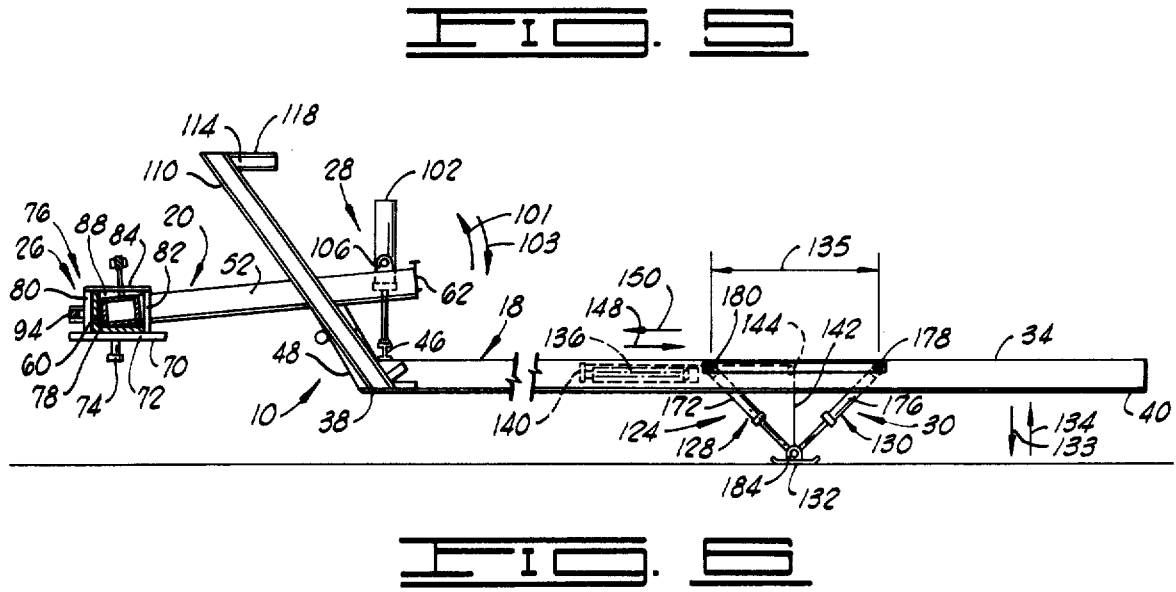

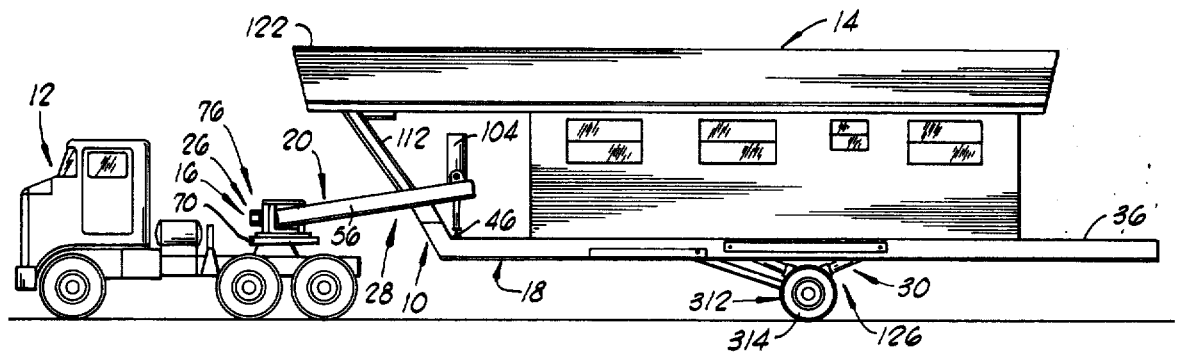
FIG. 12
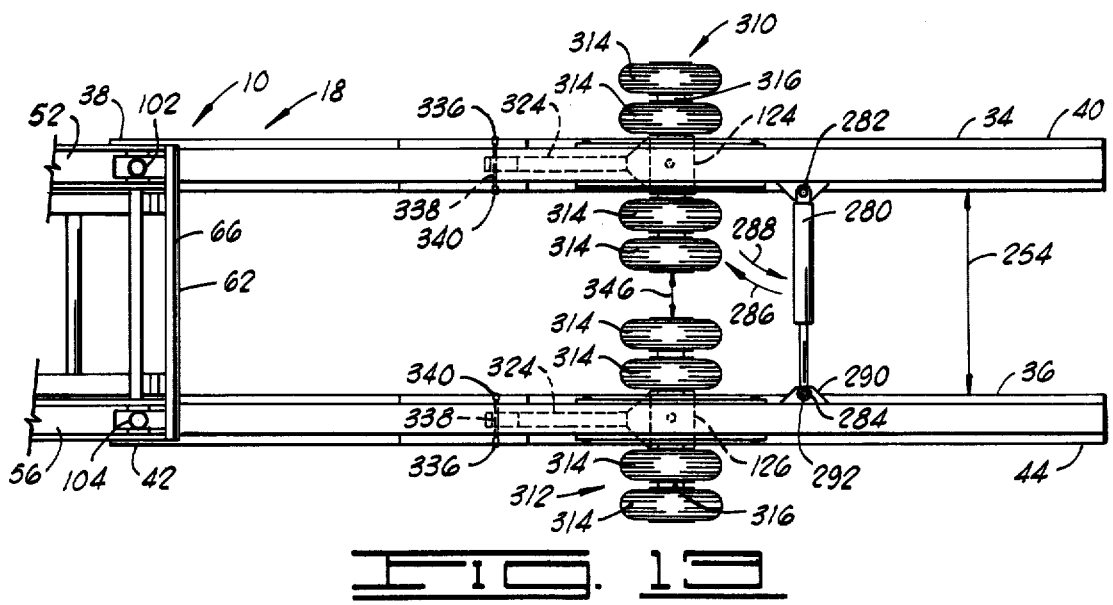
FIG. 13
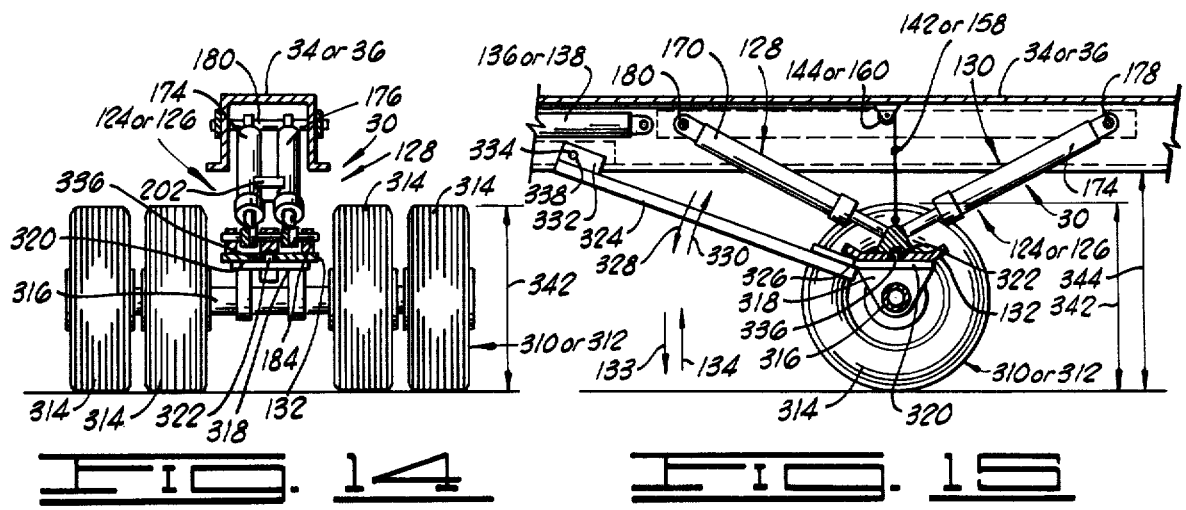
FIG. 14
FIG. 15

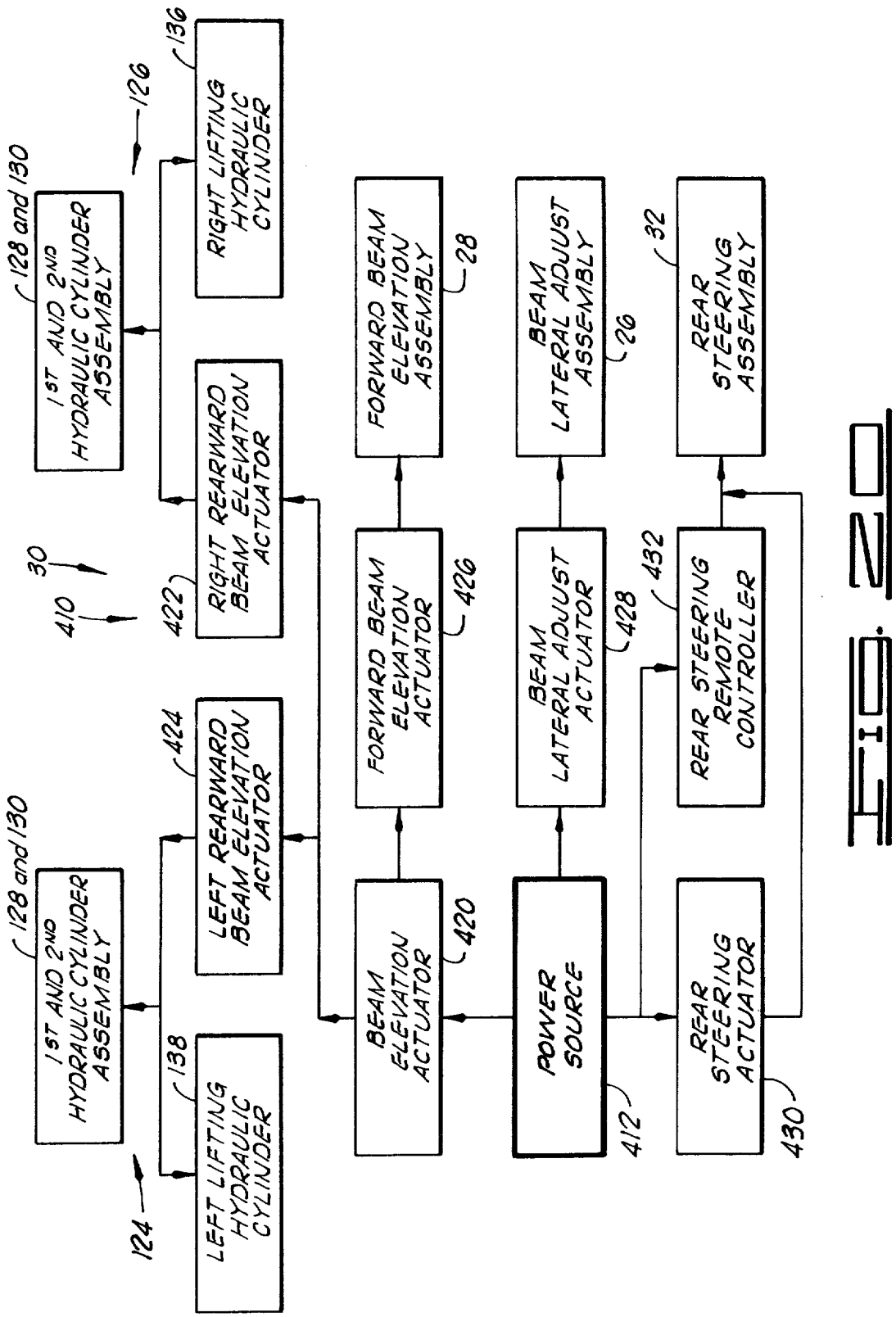

APPARATUS FOR TRANSPORTING HOUSE STRUCTURES OR THE LIKE

BACKGROUND OF THE INVENTION

1. Field of the Invention

This invention relates generally to improvements in trailer apparatus and, more particularly, but not by way of limitation, to trailer apparatus for transporting, loading and unloading house structures and the like.

2. Description of the Prior Art

Various vehicle structures have been constructed in the past having longitudinally extending beams for transporting various types of cargo wherein the beams were movable in some direction to facilitate some aspect of the transporting operation. The U.S. Pat. No. 3,442,409, issued to Larson, for example, disclosed a transport vehicle having a bed adjustable as to its area and equipped with retractable caster-type wheels. The U.S. Pat. No. 3,838,191, issued to Schramm, disclosed an elevated bed vehicle having a ground plate connected to a hydraulic cylinder via a plurality of levers for operating as a jack lifting mechanism, the ground plate engaging the ground and cooperating to elevate the vehicle bed in an actuated position of the hydraulic cylinders. The U.S. Pat. No. 2,754,987, issued to Kern, disclosed a hinged-type goose-neck for a trailer for lowering the rearward portion of the trailer bed to the ground. A tilting platform type of trailer was disclosed in the U.S. Pat. No. 2,717,707, issued to Martin, another tiltable type of trailer bed being disclosed in the U.S. Pat. No. 2,364,365, issued to Hultguist.

The U.S. Pat. No. 3,021,155, issued to Sherman, disclosed a house moving unit having a three-point suspension system wherein the two longitudinally extending beams were each supported on a wheel dolly and each were connected to a forward transverse load supporting beam, each wheel dolly supporting one of the longitudinally extending beams for pivotal movement about a horizontal axis and the forward transverse load supporting beam connected for pivotal movement about the horizontal axis. The house moving unit of the Sherman patent also disclosed a connecting splice for extending the two longitudinally extending beams.

The U.S. Pat. No. 2,588,001, issued to Holland, disclosed a house moving apparatus having projecting rails for insertion under the house structure and a truck bed tiltable about a pivot on the frame, the rails being disposed on the sides of the truck bed. After the truck was positioned near the house structure, the bed was tilted, the rails were pivoted to a ground-engaging position, the rails were driven under the house structure, a cable was wrapped about the house structure, and the house structure was then pulled up the rails onto the truck bed for transporting.

The U.S. Pat. No. 2,788,145, issued to Clark, disclosed a house moving trailer, having a lift assembly which was first positioned on the fifth wheel of the tractor, the beams were then positioned under the house and connected to cylinder housings, a brick structure or the like was built-up to provide a fulcrum for the beam wheels, the trailer was then tilted until the weight of the house structure rested squarely upon the beams, and the structure was then moved to a traveling position. The house moving trailer of the Clark patent also disclosed a wheel assembly which was pivotable to raise and lower the longitudinally extending beams.

The U.S. Pat. No. 3,545,635, issued to Montan, disclosed a preload for hauling logs wherein the preload independently supported the logs and was connectable to a truck frame, another independently supportable container connectable to a truck and trailer being disclosed in the U.S. Pat. No. 3,255,906, issued to Proler. The U.S. Pat. No. 3,330,554, issued to Kulyk, disclosed a ground loading trailer having a laterally extensible trailer bed. The U.S. Pat. No. 1,862,682, issued to Judd, disclosed a positionable trailer bed having ground engaging wheels pivotally connected to the trailer bed and a gear mechanism for moving the wheels and lifting or elevating the trailer bed; the U.S. Pat. No. 2,905,345, issued to Schramm, disclosed an elevatable wide bed type of trailer.

The U.S. Pat. No. 2,979,341, issued to Thomas, disclosed a semi-trailer combination having a fifth wheel assembly constructed to be movable transversely on the tractor chassis. An elevatable and adjustable support was also disclosed in the U.S. Pat. No. 1,337,804, issued to Towson, and a trailer hitch was disclosed in the U.S. Pat. No. 2,653,031, issued to Butler. A German Pat. No. 714,620, disclosed an adjustable, positionable support bed.

SUMMARY OF THE INVENTION

An object of the invention is to provide an apparatus for transporting house structures or the like having an improved manuveurability.

Another object of the invention is to provide an apparatus for transporting house structures or the like having an improved assembly for raising and lowering the load supporting beam members in a faster, more efficient and more economical manner.

One other object of the invention is to provide an improved apparatus for transporting house structures or the like having an improved means for positioning the longitudinal support beams beneath a house structure in a faster, more efficient and more economical manner.

One other object of the invention is to provide an improved apparatus for transporting, loading and unloading house structures or the like in a faster, more efficient and more economical manner which is economical in construction and operation.

Still another object of the invention is to provide an improved apparatus to facilitate the manufacturing of prefabricated house structures or the like in a faster, more efficient and more economical manner.

Another object of the invention is to provide an improved apparatus for loading, unloading and transporting house structures or the like having an improved load supporting stability.

Other objects and advantages of the invention will be evident from the following detailed description when read in conjunction with the accompanying drawings which illustrate various embodiments of the invention.

BRIEF DESCRIPTION OF THE DRAWINGS

FIG. 4 is a top plan view of the trailer apparatus of the present invention.

FIG. 5 is a side elevational view of the trailer apparatus of the present invention, showing the rearward beam elevation assembly in an actuated position supporting the support beams generally above the ground.

FIG. 6 is a partial sectional, partial elevational view of the trailer assembly of the present invention, taken substantially along the lines 6—6 of FIG. 4.

FIG. 7 is a front elevational view of the trailer assembly of the present invention showing the trailer assembly in a raised position and the rearward beam elevation assembly in an actuated ground-engaging position.

FIG. 8 is a partial sectional, partial elevational view of the trailer apparatus of the present invention, taken substantially along the lines 8—8 of FIG. 4.

FIG. 9 is an enlarged, partial elevational, partial sectional view of the rearward beam elevation assembly of the trailer apparatus of the present invention, taken substantially along the lines 9—9 of FIG. 4.

FIG. 10 is a top elevational view of the road dolly assembly showing the trailer support beams in dashed-lines positioned in a support position on the road dolly assembly.

FIG. 11 is a bottom elevational view of the road dolly assembly of the present invention, showing the trailer support beams in dashed-lines and positioned in a support position on the road dolly assembly.

FIG. 12 is a side elevational view of the apparatus of the present invention, similar to FIG. 3, but showing the trailer support beams supported via a plant dolly assembly.

FIG. 13 is a partial top elevational view of the trailer apparatus of FIG. 12, showing the plant dolly assemblies in a support position beneath the support beams.

FIG. 14 is an enlarged, partial elevational, partial sectional view of the trailer apparatus of FIG. 13, showing a portion of the connection between the rearward beam elevation assembly and the plant dolly assemblies.

FIG. 15 is a partial sectional, partial elevational view showing a portion of the connection between the rearward beam elevation assembly and the plant dolly assemblies.

FIG. 20 is a diagrammatical view of one embodiment of a trailer control apparatus for controlling the trailer assembly position.

DESCRIPTION OF THE PREFERRED EMBODIMENTS

Figure 1:
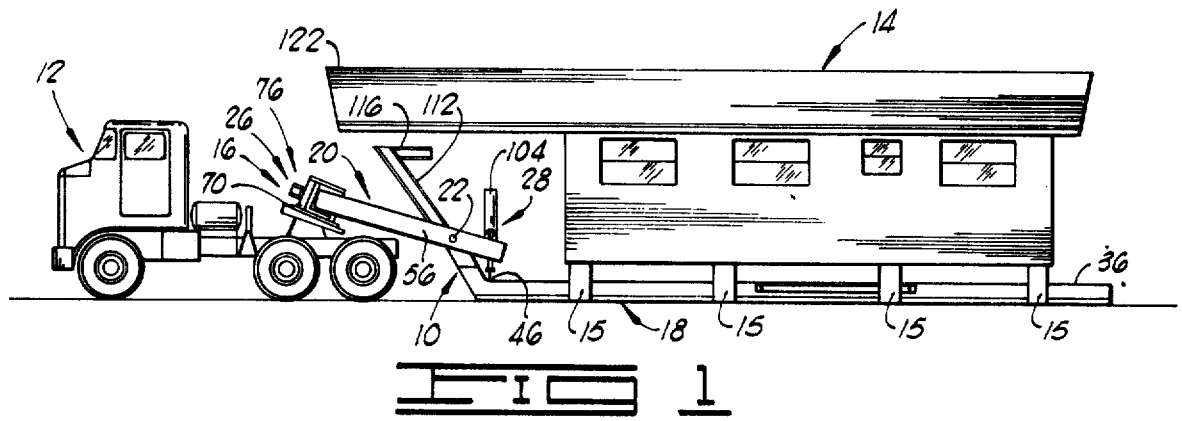
FIG. 1 is a side elevational view of the apparatus of the present invention showing the trailer assembly in a lowered position and the support beams extending beneath a house structure.
Figure 2:
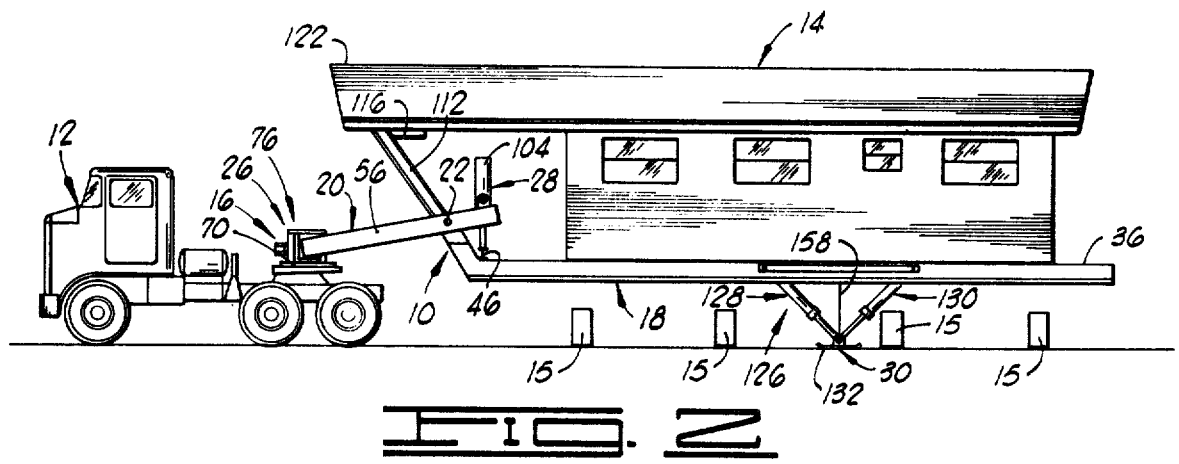
FIG. 2 is a side elevational view of the apparatus of FIG. 1 showing the trailer assembly in a raised position and the support beams supporting the house structure generally above the foundation support blocks.
Figure 3:
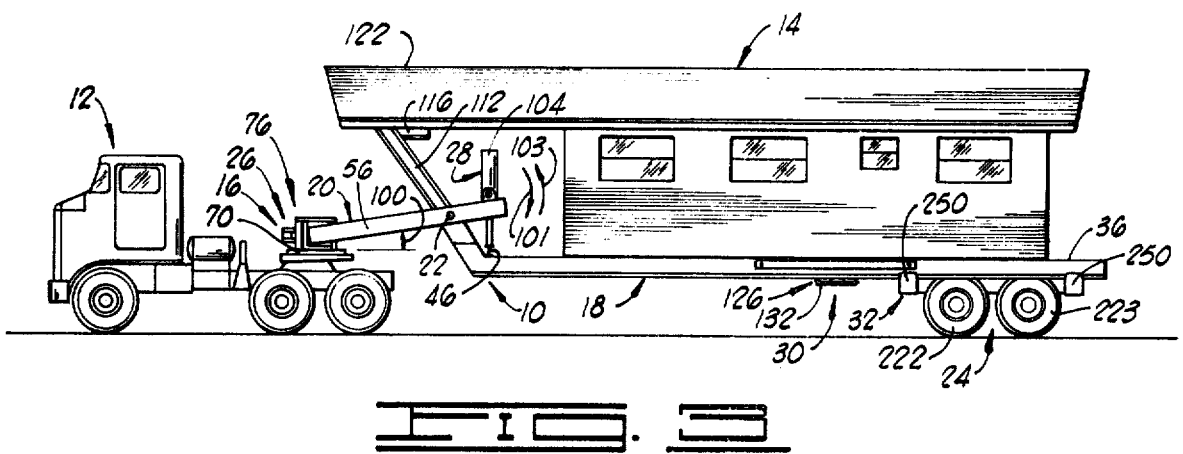
FIG. 3 is a side elevational view of the apparatus of FIGS. 1 and 2 showing the road dolly assembly in an assembled position beneath the support beams, the trailer apparatus being positioned in a transport position.

Referring to the drawings in general and to FIGS. 1, 2 and 3 in particular, shown therein and designated by the general reference numeral 10 is a trailer assembly connected in an assembled position to a tractor 12, the trailer assembly 10 being constructed in accordance with the present invention for raising, lowering, supporting and transporting house structures and the like such as the house structure 14 shown in the drawings, for example, the house structure 14 being supported a distance above the ground via a plurality of foundation support blocks 15. The trailer assembly 10 is, more particularly, connectable to a tiltable fifth wheel assembly of the tractor 12, the fifth wheel assembly 16 of the tractor 12 being tiltable about a horizontal axis located on the tractor 12 in a manner well-known in the art.

The trailer assembly 10, more particularly, includes: a support beam assembly 18 constructed for supporting the house structure 14 during the operation of the trailer assembly 10; a connector beam assembly 20 removably connectable to a tractor fifth wheel assembly 16 and pivotally connected to the support beam assembly 18 at a pivot connection 22; a road dolly assembly 24 removably connectable to the support beam assembly 18; a beam lateral adjust assembly 26 having a portion connected to the connector beam assembly 20 for laterally shifting the connector beam assembly 20 in an actuated position thereof; a forward beam elevation assembly 28 for raising and lowering the trailer assembly 10 in actuated positions thereof; a rearward beam elevation assembly 30 cooperating with the forward beam elevation assembly 28 for raising and lowering the trailer assembly 10; and a rear steering assembly 32 for independently and remotely steering the wheel dolly assembly 24 to positioningly guide the rearward end portion of the trailer assembly 10 during the operation thereof, as will be described in greater detail below.

In general, when utilizing the trailer assembly 10 of the present invention to raise a house structure or the like, such as the house structure 14 shown in FIGS. 1, 2 and 3, for example, the trailer assembly 10 is secured to the tractor fifth wheel assembly 16 and the tractor 12 is maneuvered to position the trailer assembly 10 for inserting the support beam assembly 18 generally beneath the house structure 14 to be raised, supported and transported. The trailer control assembly (to be described in greater detail below) is then actuated to lower the support beam assembly 18 generally to a ground engaging position or, in other words, to lower the support beam assembly 18 to a predetermined horizontal planar disposition for insertion generally beneath the house structure 14. To lower the trailer assembly 10, the rearward beam elevation assembly 30 is first actuated to raise the support beam assembly 18 to a predetermined horizontal plane disengaging the trailer assembly 12 from the road dolly assembly 24. The road dolly assembly 24 is then removed from supporting engagement with the trailer assembly 10 and the forward beam elevation assembly 28 and the rearward beam elevation assembly 30 are each actuated to lower the trailer assembly 10 to a ground engaging position or, more particularly, to a predetermined horizontal plane for insertion generally beneath the structure to be supported.

In this position of the trailer assembly 10, the tractor 12 is maneuvered to insert the support beam assembly 18 of the trailer assembly 10 generally beneath the house structure 14, as shown in FIG. 1. After the support beam assembly 18 has been positioned beneath the house structure 14, the beam lateral adjust assembly 26 is actuated, in some instances, to laterally position the support beam assembly 18 at a predetermined position beneath the house structure 14 so that the load imposed on the support beam assembly 18 by the house structure 14 will be evenly distributed and balanced in a transport position of the trailer apparatus 10. The forward beam elevation assembly 28 and the rearward beam elevation assembly 30 are then each actuated to raise the trailer assembly 10 or, more particularly, to raise the support beam assembly 18 in an upwardly direction generally toward the house structure 14. As the support beam assembly 18 is raised, the support beam assembly 18 will engage the house structure 14 and the support beam assembly 18 and house structure 14 supported thereon will then continue to be raised in a generally upwardly direction to a predetermined horizontal plane wherein the house structure 14 has been disengaged and elevated a distance above the foundation support blocks 15, as shown in FIG. 2.

It should be noted that the forward beam elevation assembly 28 and the rearward beam elevation assembly 30 will each cooperate to continue elevating or raising the trailer assembly 10 or, more particularly, the support beam assembly 18 in a generally upwardly direction to a position wherein the support beam assembly 18 is disposed in a predetermined horizontal plane a sufficient distance above the ground so that the road dolly assembly 24 can be reinserted beneath the rearward portion of the support beam assembly 18. More particularly, in one preferred form, the rearward beam elevation assembly 28 is positioned in an actuated position supporting the rearward end portion of the support beam assembly 18 in a predetermined elevated position. In this position of the trailer assembly 12, the forward beam elevation assembly 30 is actuated to a position lowering the forward end portion of the trailer assembly 10 generally toward a ground engaging position thereby pivotally elevating the rearward end portion of the support beam assembly 18 in a generally upwardly direction about the rearward beam elevation assembly 30 to a predetermined angular position of the support beam assembly 18 wherein the rearwardmost end portion of the trailer assembly 10 is sufficiently elevated for receiving the road dolly assembly 24. In this manner, the hydraulic cylinders utilized to supportingly elevate the rearward end portion of the support beam assembly 18 do not have to be constructed to elevate the support beam assembly 18 the additional height required for insertion of the road dolly assembly 24, thereby facilitating the utilization of hydraulic cylinders having a substantially shorter stroke and increased lifting power in a more efficient and more economical manner as will be made more apparent below.

After the road dolly assembly 24 has been positioned under the support beam assembly 18, the forward beam elevation assembly 28 is actuated to lower the rearwardmost end portion of the trailer assembly 10 or, more particularly, the support beam assembly 18 to a position wherein the rearward end portion of the support beam assembly 18 engages and is supported generally on a portion of road dolly assembly 24, the road dolly assembly 24 cooperating with the tractor 12 and the beam assemblies of the trailer assembly 10 to rollingly support the house structure 14 in a transport position, as shown in FIG. 3. In the transport position of the trailer assembly 10, the trailer assembly 10 and house structure 14 supported thereon can be transported via the tractor 12 to predetermined remote locations.

After the house structure 14 has been transported to some predetermined location, the trailer assembly 10 is then maneuvered via the tractor 12 to position the house structure 14 in a predetermined location for unloading the house structure 14 on prelocated foundation support blocks, such as the support blocks 15, for example. During the maneuvering of the trailer assembly 10 via the tractor 12 to position the house structure 14, the rearward end portion of the trailer assembly 10 is independently and remotely controllable via the rear steering assembly 32 in such a manner that the trailer assembly 10 can be more accurately positioned for unloading the house structure 14 in a predetermined location.

After the trailer assembly 10 has been positioned to unload the house structure 14 at a predetermined location, the forward beam elevation assembly 28 is actuated to a position lowering the forward end portion of the support beam assembly 18 thereby pivotally raising the rearwardmost end portion of the support beam assembly 18 supported via the rearward beam elevation assembly 30 above the road dolly assembly 24, thereby disengaging the road dolly assembly 24 from the support beam assembly 18, the road dolly assembly 24 being removed from beneath the support beam assembly 18 in a manner generally described above. After the road dolly assembly 24 has been removed from beneath the support beam assembly 18, the forward beam elevation assembly 28 is actuated to raise the forward end portion of the support beam assembly 18 to a position wherein the support beam assembly 18 is supported in a generally horizontal planar disposition, and the forward beam elevation assembly 28 and the rearward beam elevation assembly 30 are each then actuated to lower the support beam assembly 18, thereby lowering the house structure 14 to a supported position generally on the prelocated foundation support blocks 15. The tractor 12 is then maneuvered to pull the support beam assembly 18 from beneath the house structure 14 and the trailer assembly 10 is then raised, the road dolly assembly 24 is maneuvered to an assembled position with respect to the support beam assembly 18 and the support beam assembly 18 is then lowered to connectingly engage the road dolly assembly 24, thereby positioning the trailer assembly 10 in a transport position in a manner similar to that generally described before.

As shown more clearly in FIG. 4, the support beam assembly 18, more particularly, includes a pair of longitudinally extending support beams 34 and 36, the support beam 34 having a forward end portion 38 and a rearward end portion 40 and the support beam 36 having a forward end portion 42 and a rearward end portion 44. The support beams 34 and 36 are disposed in a generally parallel relationship and a brace member 46 extends between the two support beams 34 and 36, generally near the forward end portions 38 and 42, one end of the brace member 46 being secured to the support beam 34 near the forward end portions 38 thereof and the opposite end of the brace member 46 being secured to the support beam 36 near the forward end portion 42 thereof. The brace member 46 provides a rigid support extending between and connecting the forward end portions 38 and 42 of the support beams 34 and 36, respectively.

An angle bar 48 is secured to the forward end portion 38 of the support beam 34 and an angle bar 50 is secured to the forward end portion 42 of the support beam 36. Each of the angle bars 48 and 50 extend generally angularly upwardly from the respective support beams 34 and 36, as shown more clearly in FIGS. 5 and 6. The end of the angle bar 48, opposite the end secured to the support beam 34, is pivotally secured to a connector beam 52 via a pivot axle 54 journally connected to the connector beam 52, the support beam 34 being pivotally connected to the connector beam assembly 20 via the pivot axle 54, as shown more clearly in FIG. 4. The end of the angle bar 50, generally opposite the end secured to the support beam 36, is pivotally secured to a connector beam 56 via a pivot axle 58 journally connected to the connector beam 56, the support beam 36 being pivotally secured to the connector beam assembly 20 via the pivot axle 58. The pivot axle 54 is axially aligned with the pivot axle 58 such that the two pivot axles 54 and 56 each pivot one of the support beams 34 and 36 about a beam pivot axis 59. The angle bars 48 and 50 cooperate to space the support beams 34 and 36 a distance below the connector beam assembly 20 to facilitate the pivotal movement of the support beam assembly 18 and the connector beam assembly 20 about the beam pivot axis 59 during the operation of the trailer apparatus 10.

As shown more clearly in FIGS. 4, 5, 6, 7 and 8, the connector beam assembly 20 includes the connector beams 52 and 56, each of the connector beams 52 and 56 extending longitudinally in a direction generally parallel to the extension of the support beams 34 and 36. The connector beam assembly 20 has a forward end 60 and a rearward end 62, the two connector beams 52 and 56 extending generally between the forward end 60 and the rearward end 62 of the connector beam assembly 20. As shown more clearly in FIG. 4, the connector beam assembly 20 is generally rectangularly shaped and a forward connector bar 64 is secured between the connector beams 52 and 56, one end of the forward connector bar 64 being secured to the forward end portion of the connector beam 52 and the opposite end of the forward connector bar 64 being secured to the forward end portion of the connector beam 56. A rearward connector bar 66 extends between the connector bars 52 and 56, one end of the rearward connector bar 66 being secured to the rearward end portion of the connector bar 52 and the opposite end portion of the rearward connector bar 66 being secured to the rearward end portion of the connector beam 56. The forward connector bar 64 and the rearward connector bar 66 each secure the connector beams 52 and 56 in a spaced stationary relationship forming the integral connector beam assembly 20, the forward connector bar 64 forming the forward end and the rearward connector bar 66 forming the rearward end of the connector beam assembly 20.

The beam pivot axis 59 is spaced a distance 68 from the rearward end of the connector beam assembly 20, as shown more clearly in FIGS. 4 and 5. The spacing of the beam pivot axis 59 from the end of the connector beam assembly 20 facilitates the connection of an assembly between the rearward end of the connector beam assembly 20 and the forward end of the support beam assembly 18 for maintaining an adjustable relationship between the connector beam assembly 20 and the support beam assembly 18, the assembly being adjustable in one position lowering the forward end portion of the trailer assembly 10 and adjustable in one other direction raising the forward end portion of the trailer assembly 10, for reasons and in a manner which will be made more apparent below.

As shown more clearly in FIGS. 5 and 6, the connector beam assembly 20 includes a fifth wheel connector 70 having a base 72 and a connector pin 74 secured to the base 72 and extending a distance generally downwardly therefrom. The connector pin 74 is sized and positioned on the fifth wheel connector 70 for locking engagement with the tiltable fifth wheel assembly 16 of the tractor 12 for removably securing the trailer assembly 10 to the tractor 12 via the tractor fifth wheel assembly 16, as generally referred to before.

Figures 7, 8, 9, 10, 11:
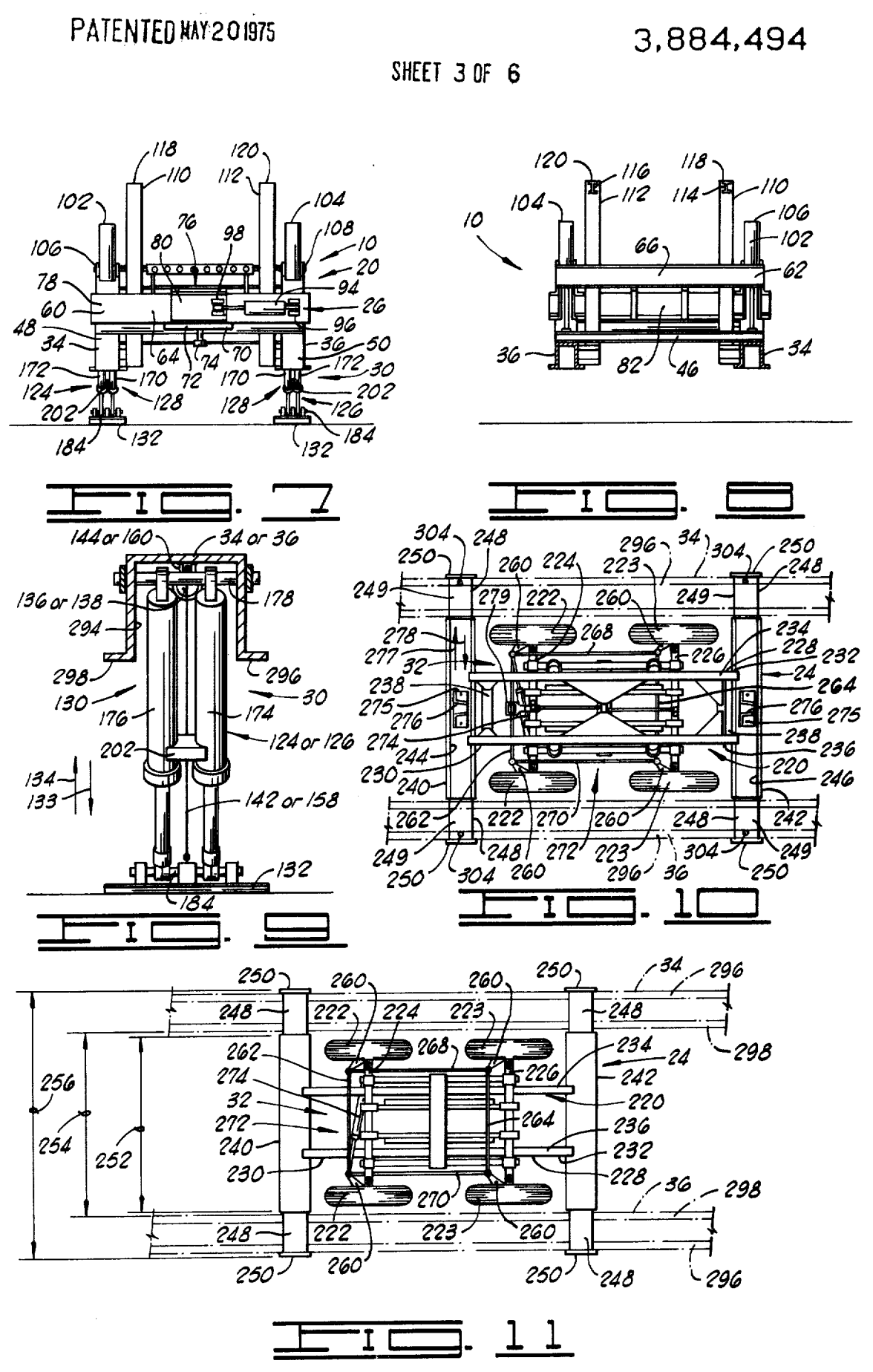

As shown more clearly in FIGS. 5, 6 and 7, a slide assembly 76 is formed on the upper surface of the base 72, the slide assembly 76 being constructed to slidingly receive the forward end 60 portion of the connector beam assembly 20 and, more particularly, to slidingly receive an L-shaped flange 78 secured to the forward connector bar 64, as by welding the L-shaped flange 78 to the forward connector bar 64, for example. The slide assembly 76 includes a pair of parallel sides 80 and 82, each of the sides 80 and 82 being secured to the base 72 of the fifth wheel connector 70 and extending generally perpendicularly upwardly therefrom. A pair of top bars 84 and 86 are secured to the two sides 80 and 82, each of the top bars 84 and 86 extending generally between the sides 80 and 82 and each of the top bars 84 and 86 being secured to each of the sides 80 and 82, as shown in FIG. 4. The space 88 extending between the sides 80 and 82 and between the top bars 84 and 86 and the base 72 of the fifth wheel connector 70 forms what is sometimes referred to below as a "slide chamber 88," the slide chamber 88 slidingly and retainingly receiving a portion of the forward end of the connector beam assembly 20 such that the connector beam assembly 20 can be laterally slid or moved within the slide assembly 76 in a direction 90 and in a direction 92 generally transversely to the longitudinally extending connector beams 52 and 56 and the longitudinally extending support beams 34 and 36 of the trailer apparatus 10.

The beam lateral adjust assembly 26 is, more particularly, secured between the L-shaped flange 78 of the connector beam assembly 20 and the side 80 of the slide assembly 76, as shown more clearly in FIG. 7. The beam lateral adjust assembly 26 includes a lateral hydraulic cylinder 94, the lateral cylinder 94 being pivotally secured to the L-shaped flange 78 via an interconnecting flange 96 and the piston rod of the lateral hydraulic cylinder 94 being secured to the side 80 of the slide assembly 76 via a flange 98, as shown more clearly in FIG. 4. Since the slide assembly 76 is secured in a stationary position to the tractor fifth wheel assembly 16 via the connector pin 74, actuation of the lateral hydraulic cylinder 94 to extend and retract the piston rod thereof will move the L-shaped flange or, in other words, will move the connector beam assembly 20 in the directions 90 and 92 relative to the tractor fifth wheel assembly 16 in response to the actuation of the lateral hydraulic cylinder 94.

In a preferred form and as shown more clearly in FIGS. 5 and 6, the forward connector bar 64 is secured to the L-shaped flange 78 such that the connector beams 52 and 56 extend angularly upwardly from the base 72 of the fifth wheel connector 70 at an angle 100. Thus, the connector beam assembly 20 is constructed to extend angularly upwardly from the fifth wheel connector 70 at the angle 100, the connector beam assembly 20 also extending in a plane angularly disposed with respect to the planar disposition of the support beams 34 and 36 at the angle 100 when the support beams 34 and 36 and the tractor fifth wheel assembly 16 are each positioned in a transport position, as shown in FIG. 3.

The angular relationship between the connector beam assembly 20 and the support beam assembly 18 varies as the tractor fifth wheel assembly 16 is tilted or pivoted about its horizontal pivot axis (not shown) via the actuation of the forward beam elevation assembly 28 in pivot directions 101 and 103 pivotally lowering and raising the connector beam assembly 20. As the connector beam assembly 20 is pivoted in directions 101 and 103 generally toward and away from the support beam assembly 18, the support beam assembly 18 is pivoted with respect to the connector beam assembly 20 about the beam pivot axis 59 formed via the pivot axles 54 and 58 pivotally interconnecting the support beam assembly 18 and the connector beam assembly 20, thereby lowering and raising the support beam assembly 18 and the load supported thereon.

The forward beam elevation assembly 28 thus includes the tiltable fifth wheel assembly 16, in one aspect, and, more particularly, includes a pair of forward elevation hydraulic cylinders 102 and 104, each of the forward elevation hydraulic cylinders 102 and 104 being connected between the connector beam assembly 20 and the support beam assembly 18 for maintaining an adjustable relationship therebetween for pivoting the support beam assembly 18 about the beam pivot axis 59. More particularly, the forward elevation hydraulic cylinder 102 is pivotally secured to the connector beam 52, generally near the rearward end 62 of the connector beam assembly 20, via a flange 106, the piston rod of the forward elevation hydraulic cylinder 102 being secured to the brace member 46 generally above the forward end portion 38 of the support beam 34. The forward elevation hydraulic cylinder 104 is pivotally secured to the connector beam 56, generally near the rearward end 62 of the connector beam assembly 20, via a flange 108, the piston rod of the forward elevation hydraulic cylinder 104 being secured to the brace member 46 generally above the forward end portion 42 of the support beam 36.

The forward elevation hydraulic cylinder 102 and 104 are each connected to a hydraulic fluid supply and to the support beam assembly 18 and the connector beam assembly 20 such that, in one actuated position wherein the cylinder rods of the forward elevation hydraulic cylinders 102 and 104 are each inwardly retracted moving the rearward end of the connector beam assembly 20 and the forward end of the support beam assembly 18 generally toward a closer proximity, the support beam assembly 18 and the connector beam assembly 20 are each moved in a general direction 103 lowering the support beam assembly 18, and such that, in one other actuated position wherein the cylinder rods of the forward elevation hydraulic cylinders 102 and 104 are each reciprocated outwardly moving the rearward end of the connector beam assembly 18 in a direction generally away from each other or increasing the separation therebetween, the connector beam assembly 20 and the support beam assembly 18 are each moved in a general direction 103 raising the support beam assembly 18. The forward elevation hydraulic cylinders 102 and 104 thus provide a controllable, adjustably varying connection between the rearward end 62 of the connector beam assembly 20 and the forward end portions 38 and 42 of the support beams 34 and 36 constructed and positioned to substantially prevent and reduce torsional twisting forces on the support beam assembly 18 and the connector beam assembly 20 during the operation of the trailer apparatus 10.

It should be noted that, in one preferred form, the forward elevation hydraulic cylinders 102 and 104 are each sized such that, in a lowered position of the support beam assembly 18 (FIG. 1), the cylinder rods have not been reciprocated inwardly through the full stroke of the forward elevation hydraulic cylinders 102 and 104. In this manner, the forward elevation hydraulic cylinders 102 and 104 each provide a means for relatively minor adjustment during the operation of the trailer assembly 10, which may be desirable in some applications.

An extension beam 110 is secured on one end thereof to the forward end portion 38 of the support beam 34, the extension beam 110 extending a distance angularly upwardly from the support beam 34. One end of an extension beam 112 is secured to the forward end portion 42 of the support beam 36, the extension beam 112 extending a distance angularly upwardly from the support beam 36. A roof support flange 114 is secured to the uppermost end of the extension beam 110, generally opposite the end thereof secured to the support beam 34, and a roof support flange 116 is secured to the uppermost end of the extension beam 112, generally opposite the end thereof secured to the support beam 36. The roof support flanges 114 and 116 each form and provide roof support surfaces 118 and 120, respectively, the roof support surfaces 118 and 120 being disposed in a coplanar relationship and spaced a distance above the connector beam assembly 20 and the support beam assembly 18 for engaging and supporting a carport or roof extension such as the roof extension 122, for example, of the house structure 14, as shown in FIGS. 1, 2 and 3, in a transport position of the trailer assembly 10, as shown in FIG. 3. Thus, when the trailer assembly 10 is elevated and positioned in a transport position supporting the house structure 14 or the like, the roof support surfaces 118 and 120 each engage a lower portion of the roof extension 122 and provide structural support for the roof extension 122 as the house structure 14 is transported via the trailer assembly 10 and the tractor 12.

In one form, the upper portions of the extension beams 110 and 112 are constructed such that the extension beams 110 and 112 can be telescoped in a generally upwardly and a generally downwardly direction to adjust the horizontal disposition of the roof support surfaces 118 and 120. In this form, a pin type of locking member of the like is disposed between the telescoping portions of the extension beams 110 and 112 to secure the extension beams 110 and 112 in predetermined positions or, more particularly, for securing the roof support surfaces 118 and 120 in predetermined horizontal dispositions, thereby providing a roof support structure having an adjustable height for transporting house structures wherein the roof extensions are disposed in different or varying horizontal planar dispositions with respect to the base of the house structure.

The rearward beam elevation assembly 30, more particularly, includes a left rearward beam elevation assembly 124 and a right rearward beam elevation assembly 126, the left rearward beam elevation assembly 124 being connected to the support beam 34 and the right rearward beam elevation assembly 126 being connected to the support beam 36. The left and the right rearward beam elevation assemblies 124 and 126 are each spaced a distance 128 from the rearward end portions 40 and 44 of the support beams 34 and 36, as shown in FIGS. 5 and 6. More particularly, the left and the right rearward beam elevation assemblies 124 and 126 are each positioned generally between the portion of the support beams 34 and 36 supported via the road dolly assembly 24 in a transport position of the trailer assembly 10 and the forward end portions 38 and 42 of the support beams 34 and 36, for reasons which will be made apparent below.

As shown more clearly in FIGS. 5, 6, 7 and 9, the left and the right rearward beam elevation assemblies 124 and 126 each include: a first hydraulic cylinder assembly 128 and a second hydraulic cylinder assembly 130. The first and the second hydraulic cylinder assemblies 128 and 130 are each pivotally connected to the support beam assembly 18 and each are pivotally connected to a ground engaging plate 132. The second hydraulic cylinder assembly 130 extends in a generally opposite direction from the ground engaging plate 132 with respect to the orientation of the first hydraulic cylinder assembly 128, the first and the second hydraulic cylinder assemblies 128 and 130 each cooperating to move the ground engaging plate 132 in a direction 133 generally toward the support beams 34 and 36, thereby lowering the rearward end portion of the support beam assembly 18 and each cooperating to move the ground engaging plate 132 in a direction 134, thereby raising the rearward end portion of the support beam assembly 18.

The left and the right rearward beam elevation assemblies 124 and 126 are each constructed similar, the left and the right rearward beam elevation assemblies 124 and 126 including a lifting hydraulic cylinder 136 and 138, respectively. The lifting hydraulic cylinder 136 is secured to the support beam 34 and positioned such that the cylinder rod 140 thereof extends outwardly from the cylinder base generally toward the forward end portion 38 of the support beam 34, a cable 142 being secured on one end thereof to the end of the cylinder rod 140. The cable 142 extends from the cylinder rod 140 generally toward the rearward end portion 40 of the support beam 34 and is disposed over a pulley 144, the end of the cable 142, generally opposite the end secured to the cylinder rod 140, being secured to the ground engaging plate 132. Thus, the cable 142 is secured to the ground engaging plate 132, to the cylinder rod 140 of the lifting hydraulic cylinder 136 and extends over the pulley 144 such that, when the lifting hydraulic cylinder 136 is actuated to reciprocate the cylinder rod 140 in an outwardly direction, the cable 142 is pulled in a general direction 148, as shown in FIGS. 4 and 6, thereby pulling the ground engaging plate 132 in a generally upwardly direction 133 and such that, when the lifting hydraulic cylinder 136 is actuated to reciprocatingly retract the cylinder rod 140, the cable 142 is released in a direction 150, thereby releasing the cable 142 and allowing the ground engaging plate 132 to be lowered or extended a distance from the support beam 34 in a direction 134, for reasons which will be made more apparent below.

The lifting hydraulic cylinder 138 is secured to the support beam 36 and positioned such that the cylinder rod 156 thereof extends outwardly from the cylinder base generally toward the forward end portion 42 of the support beam 36, a cable 158 being secured on one end thereof to the end of the cylinder rod 156. The cable 158 extends from the cylinder rod 156 generally toward the rearward end portion 44 of the support beam 36 and is disposed over a pulley 160, the end of the cable 158, generally opposite the end secured to the cylinder rod 156, being secured to a ground engaging plate 132. Thus, the cable 158 is secured to the ground engaging plate 132, to the cylinder rod 156 of the lifting hydraulic cylinder 138 and extends over the pulley 160 such that, when the lifting hydraulic cylinder 138 is actuated to reciprocate the cylinder rod 156 in an outwardly direction, the cable 158 is pulled in a general direction 164, as shown in FIGS. 4 and 5, thereby pulling the ground engaging plate 132 in a generally upwardly direction 133 and such that, when the lifting hydraulic cylinder 136 is actuated to reciprocatingly retract the cylinder rod 156, the cable 158 is released in a direction 166, thereby releasing the cable 158 and allowing the ground engaging plate 132 to be lowered or extended a distance from the support beam 34 in a direction 134, for reasons which will be made more apparent below.

Thus, the lifting hydraulic cylinders 136 and 138 are each supported on the support beams 34 and 36 to apply a force in a direction generally transverse to the moving directions 133 and 134 of the ground engaging plates 132. The pulleys 144 and 160 are each oriented to rollingly engage one of the cables 142 and 158 between the lifting hydraulic cylinders 136 and 138 and the ground engaging plates 132 and translate the force applied via the lifting hydraulic cylinders 136 and 138 to a direction generally parallel to the moving directions 133 and 134 of the ground engaging plates 132. The lifting hydraulic cylinders 136 and 138 and the cables 142 and 158 are also located to orient the cables 142 and 158 for applying a lifting force in a plane generally parallel to the planar disposition of the forces applied via the first and the second hydraulic cylinders 128 and 130, in a manner to be made more apparent below.

The first and the second hydraulic cylinder assemblies 128 and 130 each include a pair of single acting hydraulic cylinders, the first hydraulic cylinder assembly 128 having a pair of hydraulic cylinders 170 and 172 and the second hydraulic cylinder assembly 130 having a pair of hydraulic cylinders 174 and 176. The hydraulic cylinders 170 and 172 are each pivotally connected to one of the support beams 34 and 36 via a pivot shaft 178 and the hydraulic cylinders 174 and 176 are each pivotally connected to one of the support beams 34 and 36 via a pivot shaft 180, the pivot shafts 180 each being spaced the distance 135 from the respective pivot shafts 178, generally toward the forward end portion of the support beam assembly 18, as shown more clearly in FIGS. 5 and 6. As shown more clearly in FIG. 9, the cylinder rods of each of the hydraulic cylinders 170, 172, 174 and 176 of the left and the right rearward beam elevation assemblies 128 and 130 are each pivotally secured to a pivot shaft 184, each pivot shaft 184 being secured to one of the ground engaging plates 132. Thus, the left and the right rearward beam elevation assemblies 124 and 126 are each pivotable about the respective pivot shafts 184 as the forward beam elevation assembly 28 is actuated to raise and lower the forward end portion of the support beam assembly 18 to elevate the rearward end portion of the support beam assembly 18 for insertion of the road dolly assembly 24 in a manner described before.

It should be noted that, in a preferred form, the lifting hydraulic cylinders 136 and 138 are each secured to the support beam assembly 18 such that the cables 142 and 158 each extend generally between one of the pairs of hydraulic cylinders 170 and 172 and between one of the pairs of hydraulic cylinders 174 and 176, each pulley 144 and 160 being generally centrally disposed between one of the pairs of hydraulic cylinders 170 and 172 and one of the pairs of hydraulic cylinders 174 and 176. In this manner, the lifting hydraulic cylinders 136 and 138 and the cables 142 and 158 are connected to the ground engaging plates 132 and apply a lifting force along a plane generally coplanar with the forces applied via the first and the second hydraulic cylinder assemblies 128 and 130, as generally mentioned before.

In a preferred form, each of the pairs of hydraulic cylinders 170 and 172, and 174 and 176 of the first and the second hydraulic cylinder assemblies 128 and 130 are securedly interconnected via a plate 202 extending therebetween and secured to each cylinder of each pair of hydraulic cylinders such as by welding, for example, so that each of the pairs of hydraulic cylinders 170–172 and 174–176 form an integral unit providing a unitary action during the operation of the left and the right rearward beam elevation assemblies 124 and 126. The secure interconnection of each of the pairs of hydraulic cylinders 170–172 and 174–176 via the plates 202 reduces the lateral movement of the hydraulic cylinders 170, 172, 174 and 176, thereby providing a more stable, efficient and safer assembly for raising, lowering and supporting the support beam assembly 18 during the operation of the trailer apparatus 10.

Since the rearward beam elevation assembly 30 and, more particularly, the left and the right rearward beam elevation assemblies 124 and 126 each function to raise, lower and support the support beams 34 and 36, thereby functioning to raise, lower and support the load supported on the support beams 34 and 36 during the operation of the trailer assembly 10, the hydraulic cylinders 170, 172, 174 and 176 must each be constructed and oriented to exert and provide a relatively large amount of power during the power strokes thereof. It has been found, when using hydraulic cylinders of this size and oriented in a manner described before, that when the hydraulic cylinders are each connected to exhaust causing the cylinder rods to be reciprocatingly retracted due to the weight of the support beam assembly 18, the hydraulic cylinders each cooperate to allow the ground engaging plates 132 to retract toward the respective support beams 34 and 36; however, it has been found that a force is required to pull the ground engaging plates 132 to a position generally adjacent the support beams 34 and 36 in a retracted position. Thus, the lifting hydraulic cylinders 136 and 138 each provide an augmenting power for lifting the ground engaging plates 132 to a retracted position, the force provided via the lifting hydraulic cylinders 136 and 138 being connected to the ground engaging plates 132 via the cables 142 and 158 interconnecting the lifting hydraulic cylinders 136 and 138 to the respective ground engaging plates 132.

In one preferred embodiment, the forward elevation hydraulic cylinders 102 and 104, the hydraulic cylinders 170, 172, 174 and 176 of the first and the second hydraulic cylinder assemblies 128 and 130, and the lifting hydraulic cylinders 136 and 138 are each single acting type of hydraulic cylinders and the trailer control assembly includes a hydraulic pump or the like for supplying pressurized hydraulic fluid. The exhaust ports of each of the hydraulic cylinders, mentioned before, are each connected to a hydraulic fluid reservoir or the like. The forward elevation hydraulic cylinders 102 and 104 are connected in hydraulic parallel so that pressurized hydraulic fluid is applied simultaneously thereto. The rearward elevation hydraulic cylinders 170, 172, 174 and 176 are each connected to the hydraulic fluid source for simultaneously receiving pressurized fluid therefrom and for simultaneously connecting each to exhaust. The lifting hydraulic cylinders 136 and 138 of the rearward beam elevation assembly 30 are each connected to the hydraulic fluid source and to the reservoir such that each of the lifting hydraulic cylinders 136 and 138 are connected to exhaust or to the reservoir when the hydraulic cylinders 170, 172, 174 and 176 are connected to the hydraulic fluid source for receiving pressurized fluid therefrom.

Thus, the trailer control assembly is connected such that the lifting hydraulic cylinders 136 and 138 are each actuated to reciprocatingly retract the cylinder rods 140 thereof simultaneous with the actuation of the hydraulic cylinders 170, 172, 174 and 176, the hydraulic cylinders 170, 172, 174 and 176 thus extending the ground engaging plates 132 a distance generally away from the support beams 34 and 36 as the hydraulic cylinder rods 140 release the cables 142 and 158. By the same token, the trailer control assembly is constructed such that the lifting hydraulic cylinders 136 and 138 are each actuated to reciprocatingly extend the cylinder rods 140 simultaneous with the actuation of the hydraulic cylinders 170, 172, 174 and 176 to reciprocatingly retract the piston rods thereof, thereby retracting the ground engaging plates 132 in a direction 133.

Referring more particularly to the road dolly assembly 24, as shown more clearly in FIGS. 10 and 11, the road dolly assembly 24 includes a dolly frame 220 rollingly supported via forward ground engaging wheels 222 and one of the forward ground engaging wheels 222 is journally and pivotally connected to each end of a first dolly axle 224 and one of the rearward ground engaging wheels 223 is journally and pivotally connected to each end of a second dolly axle 226.

The dolly frame 220 basically comprises a longitudinally extending support base 228 having a forward end 230 and a rearward end 232, the support base including a pair of longitudinally extending support members 234 and 236 connected via a plurality of transversely extending support members 238 extending generally between and connected to the longitudinally extending support members 234 and 236 to form an integral support base 228. A forward shaft member 240 is secured to the forward end 230 of the support base 228 and a rearward shaft member 242 is secured to the rearward end 232 of the support base 228, the forward and the rearward shaft members 240 and 242 each extending generally transversely to the support base 228.

As shown more clearly in FIG. 10, the forward shaft member 240, in a preferred form, includes an opening 244 formed therethrough and intersecting the opposite ends thereof and the rearward shaft member 242 also includes an opening 246 extending therethrough and intersecting the opposite ends thereof. A support extension member 248 is telescopingly disposed within a portion of the openings 244 and 246 of the forward and the rearward shaft members 240 and 242, one of the support extension members 248 being telescopingly disposed through each end of each of the forward and the rearward shaft members 240 and 242. A flange 250 is secured to the end of each support extension member 248, opposite the end thereof telescopingly disposed through one of the openings 244 and 246 of the forward and the rearward shaft members 240 and 242, each of the flanges 250 extending a distance upwardly from the support extension member 248 secured thereto, as shown more clearly in FIG. 3.

The support extension members 248 each include a surface 249 supportingly engaging a portion of the support beams 34 and 36, the support beams 34 and 36 being disposed generally on a portion of the support extension members 248 generally near the flange 250 thereof in an assembled, transport position of the road dolly assembly 24 to the support beam assembly 18. The length 252 of each of the forward and the rearward shaft members 240 and 242 is, in a preferred form, less than the distance 254 extending generally between the inside portions of the support beams 34 and 36, as shown more clearly in FIG. 11. Thus, the support extension members 248 provide an adjustable support width 256 to facilitate the removal and insertion of the road dolly assembly 24 beneath the support beam assembly 18 during the operation of the trailer assembly 10, in a manner to be made more apparent below.

The forward and the rearward wheel assemblies 222 and 223 include a flange 260 connected to the wheel hub (not shown) for steeringly moving or pivoting each of the wheel assemblies 222 and 223 about a steering axis generally transverse to the first and the second dolly axles 224 and 226 in a manner well-known in the art. A forward tie rod 262 is pivotally connected on one end to the flange 260 of one of the forward wheel assemblies 222 and on the opposite end to the flange 260 of the other forward wheel assembly 222, as shown in FIGS. 10 and 11, and a rearward tie rod 264 is pivotally connected on one end to one of the flanges 260 of one of the rearward wheel assemblies 223 and on the opposite end to the flange 260 of the other rearward wheel assembly 223. A left connecting rod 260 is pivotally connected on one end thereof to the pivotal connection between the forward tie rod 262 and one of the forward wheel assemblies 222, the opposite end of the left connecting rod 268 being pivotally connected to the pivotal connection between one of the ends of the rearward tie rod 264 and one of the rearward wheel assemblies 223, and a right connecting rod 270 is pivotally connected on one end to the pivotal connection between one end of the forward tie rod 262 and one of the forward wheel assemblies 222 and on the opposite end to the pivotal connection between one end of the rearward tie rod 264 and one of the rearward wheel assemblies 223. Thus, the forward and the rearward tie rods 262 and 264 and the left and the right connecting rods 268 and 270 are connected to form a parallelogram, the pivotal connections between the forward and the rearward tie rods 262 and 264 and the forward and the rearward wheel assemblies 222 and 223 forming the four interconnecting corners of a parallelogram-shaped tie rod assembly 272, for synchronously moving the forward and the rearward wheel assemblies 222 and 223 in response to a steering force applied thereto, for reasons and in a manner to be made more apparent below.

An electrically operated cylinder 274 is pivotally secured to the support base 228 of the road dolly assembly 24 and the piston rod of the steering cylinder 274 is pivotally secured to the pivotal connection between the forward tie rod 262, the right connecting rod 270 and the flange 260 secured to one of the forward wheel assemblies 222. The steering cylinder 274 is connected to the trailer control assembly for actuation reciprocatingly extending and retracting the piston rod to steeringly pivot the forward and the rearward wheel assemblies 222 and 223. As the steering cylinder 274 is actuated to extend and retract the piston rod thereof, the piston rod directs a steering force pushing and pulling the corner of the parallelogram-shaped tie rod assembly 272 pivotally secured thereto, thereby synchronously moving the tie rod assembly 272 to pivot the forward and rearward wheel assemblies 222 and 223 to steeringly control the road dolly assembly 224. The parallelogram shape of the tie rod assembly 272 thus allows the forward and the rearward wheel assemblies 222 and 223 to be pivotally steered utilizing a single steering cylinder 274 and assures that the pivotal steering movement of the forward and the rearward wheel assemblies 222 and 223 are synchronized to maintain a uniform steering movement of the road dolly assembly 24 for steeringly guiding the rearward end portion of the support beam assembly 18 of the trailer assembly 10 during the operation thereof.

In one preferred form, the trailer control assembly includes a rear steering remote controller connected to the trailer control assembly for actuating the steering cylinder 274. In this manner the operator can stand or be positioned at a point of optimum surveillance for guiding the rearward end portion of the support beam assembly 18 and the operator is thus able to positively control the steering movement of the rearward end portion of the support beam assembly 18 via the rear steering remote controller actuating the steering cylinder 274 to steeringly move the forward and rearward wheel assemblies 222 and 223 for guidingly positioning the support beam assembly 18 during the loading and unloading operations.

A guide plate 275 is movably secured to the forward and the rearward shaft members 240 and 242, each guide plate 275 having a guide channel 276 formed therein engageable with a center beam or the like of a house structure to facilitate the centering of the support beam assembly 18 beneath a house structure or, more particularly, for positioning the support beam assembly 18 to engage and support a house structure such that the load imposed thereby is evenly distributed. The guide plates 275 are each movably adjustable in directions 277 and 278 for use in varying applications.

A tongue 279 is secured to the support base 228, as shown more clearly in FIG. 10. The tongue 279 is shaped and positioned to be connectable to a guide rod (not shown) or the like for manually pulling and positioning the road dolly assembly 24 during the operation of the trailer assembly 10.

As shown more clearly in FIG. 4, the support beam assembly 18 also includes a brace hydraulic cylinder 280 having the cylinder casing thereof pivotally secured to the support beam 34 at a pivotal connection 282 spaced a distance from the rearward end portion 40 of the support beam 34. The cylinder rod of the brace hydraulic cylinder 280 has an eyelet 284 secured thereto. The brace hydraulic cylinder 280 is constructed and positioned on the support beam 34 such that the brace hydraulic cylinder 280 can be pivoted in a general direction 286 generally toward the support beam 34 and securedly positioned in a storage position wherein the brace hydraulic cylinder 280 extends generally parallel and along side the support beam 34. The brace hydraulic cylinder 280 is also pivotable in a direction 288 generally away from the support beam 34 about the pivotal connection 282 to a position wherein the brace hydraulic cylinder 280 extends generally transversely between the support beams 34 and 36. In this position, the brace hydraulic cylinder 280 is actuated to reciprocatingly extend the piston rod thereof to a position wherein the eyelet 284 secured on the end of the piston rod is generally aligned with an opening formed through a support 290 secured to the support member 36, as shown in FIG. 4. In this position, a securing pin 292 is disposed through the opening of the eyelet 284 of the brace hydraulic cylinder 280 and through the opening (not shown) formed through the support 290 secured to the support beam 36 thereby securing the end of the piston rod, opposite the end thereof reciprocatingly disposed within the cylinder base, to the support beam 36. The brace hydraulic cylinder 280 is also connected to the trailer control assembly so that the piston rod thereof can be actuatingly retracted or extended to maintain control of the width 254 generally between the inside portions of the support beams 34 and 36 during portions of the operation of the trailer assembly 10, for reasons and in a manner which will be made more apparent below.

As shown more clearly in FIGS. 9 and 10, the support beams 34 and 36 are each shaped in the form of channel members, having a longitudinally extending channel 294 and flanges 296 and 298, one of the flanges 296 and 298 extending a distance from each support beam 34 and 36, in one preferred embodiment. Spaced openings (not shown) are formed through the flanges 296 of the support beams 34 and 36, the openings in the flanges 296 being alignable with openings (not shown) formed through the beam supporting surfaces 249 of the support extension members 248 when the road dolly assembly 24 is positioned in a transport position beneath the support beam assembly 18 and, in this position, pins 304 are disposed through the aligned openings to securedly position the road dolly assembly 24 in the transport position.

In one preferred embodiment, the trailer assembly 10 of the present invention also includes a left and a right plant dolly assembly 310 and 312, respectively, each plant dolly assembly 310 and 312 being constructed for insertion beneath one of the support beams 34 and 36 for rollingly supporting the rearward end portion of the support beam assembly 18 during one aspect of the operation of the trailer assembly 10, as shown more clearly in FIGS. 12, 13, 14 and 15. The left and the right plant dolly assemblies 310 and 312 are each constructed similar and each include four ground engaging wheel assemblies 314 journally supported on an axle 316. More particularly, two of the wheel assemblies 314 are generally journally supported in tandem generally on one side of each of the axles 316 and two of the wheel assemblies 314 are journally supported in tandem on the opposite side of each of the axles 316, a portion of the axle 316 extending generally between the two pairs of tandem wheel assemblies 314.

A base support 318 is secured to the portion of each of the axles 316 extending between the tandem pairs of wheel assemblies 314, each of the base supports 318 extending a distance from the axle 316 secured thereto. A connector plate 320, having an alignment pin 322 formed on a central portion thereof and extending a distance generally upwardly therefrom, is secured to each of the base supports 318, for reasons which will be made more apparent below.

One end of a connector bar 324 is secured to each of the base supports 318 generally at a connection 326, each of the connector bars 324 being movable in general directions 328 and 330 about the pivot shaft 184, as shown more clearly in FIG. 15. A flange 332 is formed on the end of each connector bar 324, generally opposite the end thereof connected to the base support 318, and an opening 334 is formed through each of the flanges 332.

In this embodiment of the invention, an alignment opening 336 is formed through a central portion of each of the ground engaging plates 132, each of the alignment openings 336 being sized to receive one of the alignment pins 322 for positioning the left and the right plant dolly assemblies 310 and 312 in predetermined assembled positions with respect to the left and the right rearward beam elevation assemblies 124 and 126 or, more particularly, for positioning each of the plant dolly assemblies 310 and 312 in predetermined positions with respect to each of the support beams 34 and 36. In the assembled position of each of the plant dolly assemblies 310 and 312, the connector bars 324 are each pivoted in a general direction 330 toward the support beam 34 or 36 to a position wherein a securing pin 338 is inserted through the opening 334 in the connector bars 324 and through openings 340 formed in the support beams 34 and 36, as shown more clearly in FIG. 15, thereby securing each of the connector bars 324 to one of the support beams 34 or 36.

To position the left and the right plant dolly assemblies 310 and 312 in an assembled position for rollingly supporting the support beam assembly 18, the trailer assembly 10 is initially positioned in a transport position, as shown in FIG. 3, wherein the road dolly assembly 24 rollingly supports the rearward end portion of the support beam assembly 18. In this position, the left plant wheel assembly 310 is maneuvered beneath the left rearward beam elevation assembly 124 and, more particularly, beneath the ground engaging plate 132 of the left rearward beam elevation assembly 124, and the right plant dolly assembly 312 is maneuvered beneath the right rearward beam elevation assembly 126 or, more particularly, beneath the ground engaging plate 132 of the right rearward beam elevation assembly 126. The left and the right rearward beam elevation assemblies 124 and 126 are then actuated via the trailer control assembly to reciprocatingly extend the piston rods of the hydraulic cylinders connected thereto, thereby moving the ground engaging plates 132 in a downwardly or outwardly direction generally away from the respective support beams 34 and 36 and generally toward the base supports 318 of the left and the right plant dolly assemblies 310 and 312 disposed thereunder. The left and the right rearward beam elevation assemblies 124 and 126 remain in the actuated position moving the ground engaging plates 132 generally away from the support beams 34 and 36 to a position wherein the ground engaging plates 132 engage the base supports 318 of the left and the right plant dolly assemblies 310 and 312 and, more particularly, to a position wherein the alignment pins 322 of the left and the right plant dolly assemblies 310 and 312 are disposed through the alignment openings 336 of the ground engaging plates 132 thereby securedly and supportingly connecting the support beams 34 and 36 to the left and the right plant dolly assemblies 310 and 312 in a predetermined aligned position.

In this position of the left and the right plant dolly assemblies 310 and 312, each of the connector bars 324 is moved in a general direction 330 to a position wherein the openings 334 are generally aligned with the openings 340 formed through the respective support beams 34 and 36, the securing pins 338 being disposed through the aligned openings 334 and 340 to securedly position and connect one of the connector bars 324 to the support beam 34 and the other connector bar 324 to the support beam 36. In this position, the support beam assembly 18 is rollingly supported via the left and the right plant dolly assemblies 310 and 312 and via the wheel dolly assembly 24.

The left and the right rearward beam elevation assemblies 124 and 126 are then further actuated to reciprocatingly extend the cylinder rods and move the ground engaging plates 132 a further distance from each of the support beams 34 and 36 thereby elevatingly raising each of the support beams 34 and 36, the support beam assembly 18 being supported via the left and the right plant dolly assemblies 310 and 312 in this elevated position. More particularly, the left and the right rearward elevation assemblies 124 and 126 are actuated to raise the support beams 34 and 36 to a predetermined horizontal disposition generally above the road dolly assembly 24 thereby disengaging the support beams 34 and 36 from the road dolly assembly 24 so that the road dolly assembly 24 can be removed from beneath the support beam assembly 18. The left and the right rearward beam elevation assemblies 124 and 126 are then actuated to lower the support beams 34 and 36 to a predetermined horizontal disposition or elevation for transporting or moving the load supported thereon, during the operation of the trailer assembly 10.

It should be particularly noted that the rearward beam elevation assemblies 124 and 126 are each disposed between the road dolly assembly 24 and the forward end portion of the support beam assembly 18 so that the left and the right plant dolly assemblies 310 and 312 can be rolled beneath the support beams 34 and 36 for connecting thereto in a manner described above while the road dolly assembly 24 remains in a transport position rollingly supporting the trailer assembly 10. Further, the wheel assemblies 314 and the base support 318 of the left and the right plant dolly assemblies 310 and 312 are each sized such that the maximum clearance height (generally designated in FIGS. 3 and 15 by the reference numeral 342) is less than the height or clearance distance 344 between the ground and the lower portion of the support beams 34 and 36 when the support beam assembly 18 is rollingly supported in a transport position via the road dolly assembly 24. Thus, the road dolly assembly 24 and the left and the right plant dolly assemblies 310 and 312 are each constructed such that the left and the right plant dolly assemblies 310 and 312 can be inserted beneath the support beams 34 and 36 and assembled in a transport position thereto while the support beams 34 and 36 remain rollingly supported in the transport position via the road dolly assembly 24.

By the same token, when it is desirable to again support the support beam assembly 18 via the road dolly assembly 24, the road dolly assembly 24 is rolled beneath the support beams 34 and 36 generally near the rearward end portion thereof and the left and the right rearward elevation assemblies 124 and 126 are each actuated to reciprocatingly retract the cylinder rods of the hydraulic cylinders thereof, thereby moving the ground engaging plates 132 generally toward the support beams 34 and 36. The trailer control assembly is positioned to actuate the left and the right rearward beam elevation assemblies 124 and 126 to retract and move the ground engaging plates 132 to a storage position generally adjacent the support beams 34 and 36, in a manner described before, thereby disengaging the ground engaging plates 132 from the left and the right plant dolly assemblies 310 and 312 and lowering the support beams 34 and 36 to a position wherein the support beams 34 and 36 are supportingly engaged via the support extension members 248 of the road dolly assembly 24 positioning the road dolly assembly 24 in a transport position supporting the support beam assembly 18. The securing pins 338 are then removed from the support beams 34 and 36 thereby disengaging the hinged connector bars 324 of the left and the right plant dolly assemblies 310 and 312 and the connector bars 324 are then utilized to rollingly maneuver the left and the right plant dolly assemblies 310 and 312 from beneath the support beam assembly 18.

It should again be emphasized that the clearance heights 342 of the left and the right plant dolly assemblies 310 and 312 are each less than the clearance distance 344 between the ground and the lower portion of the support beams 34 and 36 and therefore the horizontal planar disposition of the left and the right plant dolly assemblies 310 and 312 are below the horizontal planar disposition formed by the supporting surfaces of the support beams 34 and 36. Thus, the left and the right plant dolly assemblies 310 and 312 are constructed for rollingly supporting the support beam assembly 18 in such a manner that a clearance space will exist between all portions of the left and the right plant dolly assemblies 310 and 312 and the structure, such as the house structure 14 supported via the support beam assembly 18.

The left and the right dolly assemblies 310 and 312 and the utilization of the left and the right plant dolly assemblies 310 and 312 in cooperation with the road dolly assembly 24 have been found particularly useful in developing methods for constructing and transporting prefabricated homes in a more efficient and more economical manner. In general, the prefabricated homes or house structures are iniitally constructed within a building enclosure including the building of the framework of the house structure and the finishing of the inside of the house structure, in the past.

Utilizing the left and the right plant dolly assemblies 310 and 312 in cooperation with the road dolly assembly 24 of the present invention, the basic structural framework of the prefabricated house structure is completed inside the building enclosure, the prefabricated house being supported at a predetermined elevation via foundation support blocks such as the foundation support blocks 15 shown in FIGS. 1, 2 and 3, for example. The left and the right plant dolly assemblies 310 and 312 are assembled to the trailer assembly 10 and the road dolly assembly 24 is removed therefrom, in a manner described above. The trailer assembly 10 and, more particularly, the support beam assembly 18 thereof is maneuvered via the tractor 12 to position the support beam assembly 18 generally beneath the prefabricated house structure within the building enclosure.

The left and the right plant dolly assemblies 310 and 312 are spaced apart a predetermined distance 346 in the assembled position thereof beneath the support beam assembly 18, as shown more clearly in FIG. 13, thereby providing clearance space and facilitating the individual insertion of each plant dolly assembly 310 and 312. Since the left and the right plant dolly assemblies 310 and 312 are not interconnected via a common axle or support structure in a manner similar to the road dolly assembly 24, the brace hydraulic cylinder 280 is pivoted to a position extending generally between the support beams 34 and 36 and secured therebetween via the securing pin 292, in a manner described before, the brace hydraulic cylinder 280 maintaining the structural spacing integrity between the support beams 34 and 36 during the operation of the trailer assembly 10 in cooperation with the left and the right plant dolly assemblies 310 and 312.

After the support beam assembly 18 has been positioned beneath the house structure 14, the trailer control assembly is actuated to actuate the left and the right rearward beam elevation assemblies 124 and 126 to reciprocatingly extend the piston rods thereof thereby raising the support beams 34 and 36 toward the house structure to be moved. The left and the right rearward beam elevation assemblies 124 and 126 are actuated in this manner until the support beams 34 and 36 have been elevated to a position wherein the support beams 34 and 36 each supportingly engage the house structure and raise the house structure generally a distance above the support blocks, in a position similar to that shown in FIG. 2, the salient difference being that the left and the right rearward beam elevation assemblies 124 and 126 are each raising the support beam assembly 18 via engagement of the ground engaging plates 132 against the left and the right plant dolly assemblies 310 and 312; whereas, during that portion of the operation of the trailer assembly 10, shown in FIG. 2, the support beam assembly 18 is elevatingly raised via the left and the right rearward beam assemblies 124 and 126 via engagement of the ground engaging plates 132 with the ground.

After the house structure has been elevated a distance above the support blocks, the trailer assembly 10 is pulled via the tractor 12 and maneuvered to a position generally outside the building enclosure. The partially completed building structures can then be finished with respect to the various finish operations required on the inside of the prefabricated building structures while the building structures remain in a stored position outside the building enclosure, thereby reducing the number of prefabricated house structures remaining within the building enclosure per se and reducing the processing time during which each house structure is maintained within the building enclosure during the construction of the prefabricated house structures. Thus, the space requirements generally required in the prefabricated house construction industry within a building enclosure is substantially reduced via the ease and simplicity with which the house structures can now be maneuvered to various positions utilizing the left and the right plant dolly assemblies 310 and 312 in cooperation with the road dolly assembly 24 of the trailer assembly 10.

After the house structure has been removed from the building enclosure and placed in a temporary storage position utilizing the left and the right plant dolly assemblies 310 and 312, the trailer assembly 10 can then be maneuvered to position the support beam assembly 18 generally beneath a completed finished prefabricated house structure, the support beam assembly 18 being then elevated to supportingly engage and lift the house structure via the left and the right rearward beam elevation assemblies 124 and 126, the road dolly assembly 24 being then moved to an assembled position beneath the rearward end portion of the support beam assembly 18 and the left and the right rearward beam elevation assemblies 124 and 126 being then actuated to lower the support beam assembly 18 to a transport position with respect to the road dolly assembly 24. After the support beam assembly 18 has been lowered to a transport position and secured to the road dolly assembly 24, the left and the right plant dolly assemblies 310 and 312 are removed from beneath the support beam assembly 18 and the house structure supported on the support beam assembly 18 is then transported via the trailer assembly 10 and tractor 12 to a remote location for installation in a manner described before.

Figure 16:
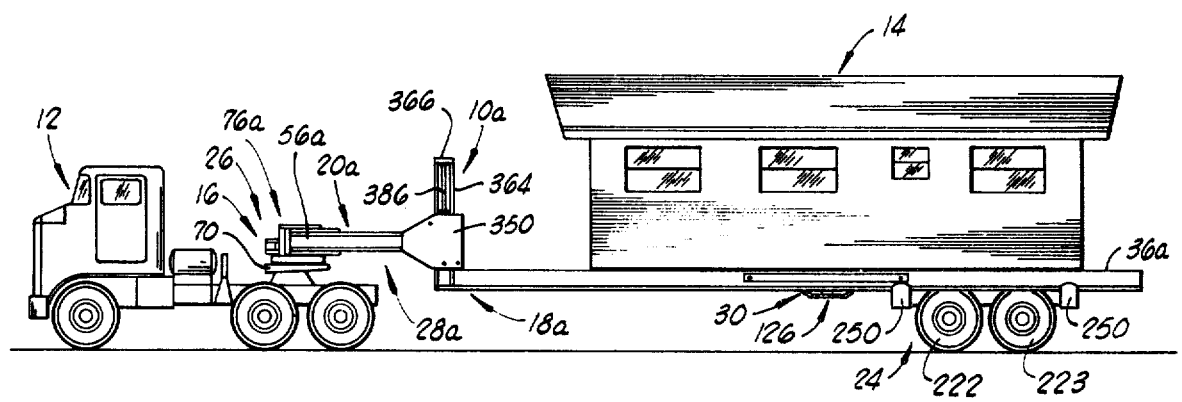
FIG. 16 is a side elevational view, similar to FIG. 3, but showing a modified trailer assembly in a transport position.
Figures 17, 18:
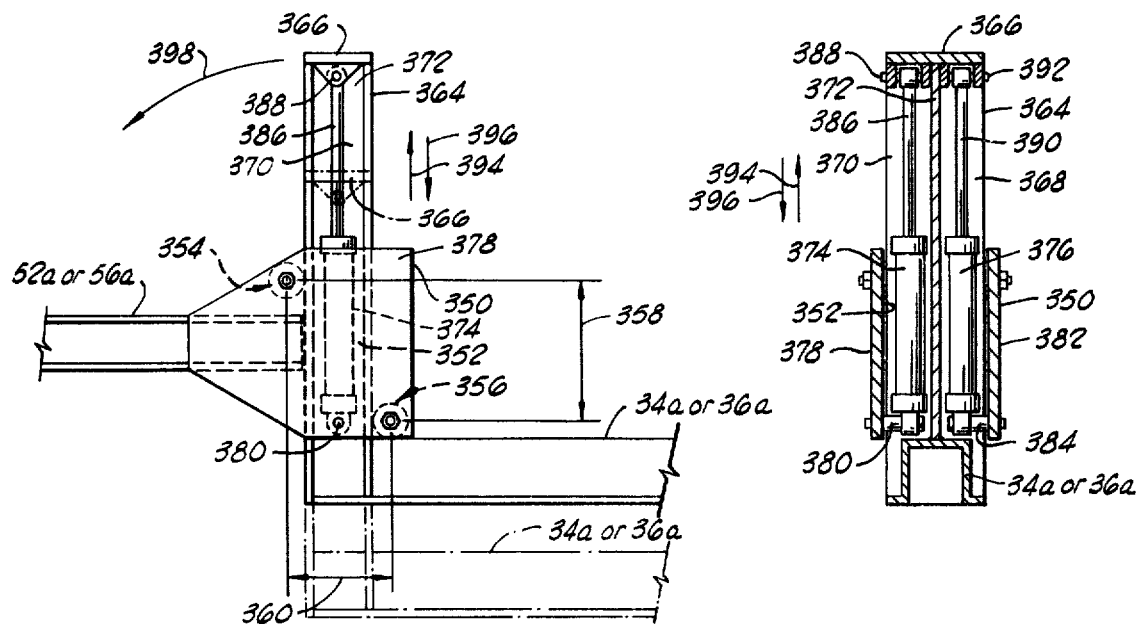
FIG. 17 is an enlarged, partial sectional, partial elevational view showing the connection between the support beam assembly and the connector beam assembly.
FIG. 18 is an enlarged, partial sectional, partial elevational view showing a portion of the connection between the support beam assembly and the connector beam assembly.

Embodiment of FIGS. 16, 17 and 18

Shown in FIGS. 16, 17 and 18 is a modified trailer assembly 10a constructed similar to the trailer assembly 10, described in detail before, for raising, lowering, supporting and transporting house structures and the like such as the house structure 14, shown in FIG. 16. The modified trailer assembly 10a includes a modified support beam assembly 18a and a modified connector beam assembly 20a.

The connector beam assembly 20a is constructed similar to the connector beam assembly 20, described before, the salient difference being that the connector beams 52a and 56a each extend in a substantially horizontal plane and are not angularly oriented at an angle 100, similar to that described before with respect to the connector beam assembly 20, for reasons which will become more apparent below.

A housing 350 is secured to the rearward end 62a of each of the connector beams 52a and 56a of the connector beam assembly 20a, as shown more clearly in FIGS. 17 and 18, each housing 350 having an opening 352 extending generally vertically therethrough intersecting the upper and the lower ends thereof. A first roller assembly 354 is rollingly supported within a portion of the opening 352 and a second roller assembly 356 is rollingly supported within the opening 352 of the housing 350, the second roller assembly 356 being spaced a vertical distance 358 from the first roller assembly 354 and the second roller assembly 356 being spaced a horizontal distance 360 from the first roller assembly 354, as shown more clearly in FIG. 17.

The support beam assembly 18a is constructed similar to the support beam assembly 18, described in detail before, the salient difference being that a slide beam 364 is secured to the forwardmost end 38a and 42a of the support beams 34a and 36a, each of the slide beams 354 extending a distance vertically upwardly from the support beams 34a and 36a terminating with an uppermost end 366. In a preferred form, as shown more clearly in FIGS. 17 and 18, each of the slide beams 364 have channels 368 and 370 formed on opposite sides of a centermost structural member 372, for reasons which will be made more apparent below.

The openings 352 in the housings 350 and the slide beams 364 are each constructed such that a portion of each of the slide beams 364 slidingly and reciprocatingly extends through a portion of one of the openings 352 of one of the housings 350, one side of each of the slide beams 364 being rollingly engaged via the first roller assembly 354 and the opposite side of each slide beam 364 being rollingly engaged via the second roller assembly 356, in an assembled position of the slide beams 364 within the openings 352 of the housings 350. Thus, each of the slide beams 364 is reciprocatingly disposed through one of the openings 352 of one of the housings 352 generally between the first and the second roller assemblies 354 and 356, as shown more clearly in FIG. 17.

The modified trailer assembly 10a also includes a modified forward beam elevation assembly 28a constructed to raise, lower and support the forward end portions 38a and 42a of the support beam assembly 18a, in a manner similar to that described before with respect to the forward beam elevation assembly 28. The forward beam elevation assembly 28a includes a pair of lifting hydraulic cylinders 374 and 376 connected between the housing 350 and the slide beam 364 associated with the respective support beams 34a and 36a.

As shown more clearly in FIG. 18, one of the lifting hydraulic cylinders 374 is secured to a side 378 of each of the housings 350 via a shaft 380 and one of the lifting hydraulic cylinders 376 is secured to an opposite side 382 of each of the housings 350 via a shaft 384. One end of the piston rod 386 of each of the lifting hydraulic cylinders 374, generally opposite the end thereof reciprocatingly disposed within the cylinder, is connected to the uppermost end 366 of each of the slide beams via a shaft 388 and one end of the piston rod 390 of each of the lifting hydraulic cylinders 376, generally opposite the end thereof reciprocatingly disposed within the cylinder, is secured to the uppermost end 366 of each of the slide beams 364 via a shaft 392. Thus, the lifting hydraulic cylinders 374 and 376 are each secured to one of the housings 350 and to the slide beam 364 slidingly and reciprocatingly disposed through the opening 352 thereof.

Thus, when the trailer control assembly is actuated to actuate the lifting hydraulic cylinders 374 and 376 to reciprocatingly extend the piston rods 386 and 390 thereof, the lifting hydraulic cylinders 374 and 376 cooperate to move the slide beams 364 in a generally upwardly direction 390 through the openings 352 and the housings 350. By the same token, when the trailer control assembly is actuated to actuate the lifting hydraulic cylinders 374 and 376 to reciprocatingly retract the piston rods 386 and 390, the lifting hydraulic cylinders 374 and 376 cooperate to move each of the slide beams 364 in a generally downwardly direction 396, thereby lowering each of the slide beams 364 and the support beams 34 and 36 connected thereto.

The horizontal distance 360 between the first and the second roller assemblies 354 and 356 permits each of the slide beams 364 to be rollingly and slidingly disposed within the openings 352 in the housings 350 and the vertical distance 358 between the first and the second roller assemblies 354 and 356 position the first and the second roller assemblies 354 and 356 such that the engagement between the first and the second roller assemblies 354 and 356 and the slide beams 364 rollingly disposed therebetween substantially prevents pivotal movement of the slide beams in a general direction 398 during the operation of the modified trailer assembly 10a.

The modified trailer assembly 10a will thus function and operate in a manner similar to the trailer assembly 10, described in detail before, the salient difference being that the forward beam elevation assembly 28a raises, lowers and supports the support beam assembly 18a generally along a vertical plane whereas the forward beam elevation assembly 28 of the trailer 10 raises and lowers the support beam assembly 18 generally about a pivot axis thereby moving the support beam assembly 18 a vertical distance while simultaneously raising and lowering the support beam assembly 18.

Figure 19:
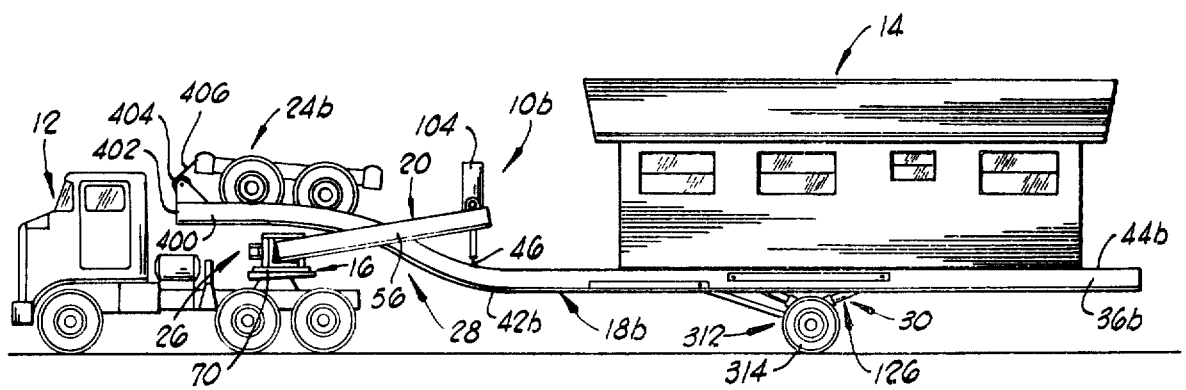
FIG. 19 is a side elevational view, similar to FIGS. 3 and 12, but showing still another modified trailer assembly constructed in accordance with the present invention.

Embodiment of FIG. 19

Another modified trailer assembly 10b is shown in FIG. 19, constructed to be connected to the tractor 12, in a manner similar to that described before with respect to the trailer assembly 10, the salient difference being that the trailer assembly 10b includes a pair of extension rails 400 (only one of the extension rails being shown in FIG. 19). Each of the extension rails 400 is connected to the forward end portions 38b and 42b of the support beams 34b and 36b. The extension rails 400 each extend generally above the connector beam assembly 20 and generally over the tractor fifth wheel assembly 16, the forwardmost end portion 402 of the extension rails 400 being disposed in a generally horizontal plane, for reasons which will be made apparent below.

A winch assembly 404 having a cable 406 is secured to the forwardmost end portion 402 of the extension rails 400. The winch assembly 404 includes a power drive connected to the winch shaft for releasing and retracting the cable 406, the winch drive being an electric motor or a hydraulic motor depending upon the desirability in a particular application. Winch assemblies driven by electric or hydraulic motors for releasing the retracting cables are well-known in the art and a detailed description of the construction and interconnection of the winch assembly 404 is not required herein.

The extension rails 400 are each constructed to engage a portion of the road dolly assembly 24b and to guide the road dolly assembly 24b to a stored position generally near the forwardmost end portion 402 of the extension rails 400, as shown in FIG. 19.

After the left and the right rearward beam elevation assemblies 128 and 130 have been actuated to raise the support beam assembly 18b above the road dolly assembly 24b, the end of the cable 406, opposite the end thereof secured to the winch assembly 404, is secured to a portion of the road dolly assembly 24b and the winch assembly 404 is actuated to retract the cable 406, thereby pulling the road dolly assembly 24b in a direction generally toward the extension rails 400. As the winch assembly 404 is driven to pull the road dolly assembly 24b toward the forwardmost end 402 of the extension rails 400, a portion of the extension rails 400 engages a portion of the road dolly assembly 24b to guide the road dolly assembly 24b to the stored position, as shown in FIG. 19. In one form, the winch assembly 404 pulls the road dolly assembly 24b to a stored position wherein the road dolly assembly 24b is supported in an angular position on the rearward end portion of the tractor 12.

After the road dolly assembly 24b has been positioned in the stored position, the winch assembly 404 is locked to secure the road dolly assembly 24b in this position as the trailer assembly 10b and tractor 12 are utilized to lower the house on the foundation, in a manner described before. The support beam assembly 18b is removed from beneath the house structure and then raised to an elevated position for the reinsertion of the road dolly assembly 24b beneath the support beam assembly 18b. In this manner, the road dolly assembly 24b remains an integral part of the trailer assembly 10b to facilitate the interconnection thereof to the support beam assembly 18b when it is again desired to transportingly support the support beam assembly 18b via the road dolly assembly 24b.

Embodiment of FIG. 20

Shown diagrammatically and schematically in FIG. 20 is a trailer control assembly 410 for use in cooperation with the trailer assembly 10 and tractor 12, in a manner similar to that described before. The trailer control assembly 410 includes a power source 412, such as a hydraulic pump and reservoir for delivering pressurized hydraulic fluid actuating the various hydraulic cylinders and components of the trailer control assembly 410, for example.

The power source 412 is connected to the left and the right rearward beam elevation assemblies 124 and 126 via a rearward beam elevation actuator 420. More particularly, the first and the second hydraulic cylinder assemblies 128 and 130 and the right lifting hydraulic cylinder 136 of the right rearward beam elevation assembly 126 are each connected to the power source 412 via the beam elevation actuator 420 and a right rearward beam elevation actuator 422 connected in series therewith. The first and the second hydraulic cylinder assemblies 128 and 130 and the left lifting hydraulic cylinder 138 of the left rearward beam elevation assembly 124 are each connected to the power source 412 via the beam elevation actuator 420 and a left rearward beam elevation actuator 424 connected in series therewith and connected in parallel with the right rearward beam elevation actuator 422. The forward beam elevation assembly 28 is connected to the power source 412 via a forward beam elevation actuator 426 connected in series with the beam elevation actuator 420. Thus, the left and the right rearward beam elevation assemblies 124 and 126 and the forward beam elevation assembly 28 are each independently controllable via the actuators 422, 424 and 426 connected thereto in an actuated open position of the beam elevation actuator 420. Further, in an actuated open position of the actuators 422, 424 and 426, the left and the right rearward elevation assemblies 124 and 126 and the forward beam elevation assembly 28 are simultaneously controllable via the beam elevation actuator 420.

The beam lateral adjust assembly 26 is connected to the power source 412 via a beam lateral adjust actuator 428, the beam lateral adjust assembly 26 being actuated to laterally shift and adjust the trailer apparatus 10, in a manner described before.

The rear steering assembly 32 is connected to the power source 412 via a rear steering actuator 430, the road dolly assembly 24 being steered via positioning the rear steering actuator 430 controlling the positioning of the rear steering assembly 32. The rear steering assembly 32 is also connected to the power source 412 via a rear steering remote controller 432, the road dolly assembly 24 being steered from a remote position via the rear steering remote controller 432 in a manner described before. The actuators 420, 422, 424, 426, 428 and 430 can each be control valve actuators located in the cab of the tractor 12, for example, and the rear steering remote controller 432 can include a control valve and a remote pneumatic or electric type of valve actuator, for example.

Changes may be made in the construction and the operation of the various components and the assemblies of the apparatus described herein without departing from the spirit and the scope of the invention as defined in the following claims.

What is claimed is:

1. Trailer apparatus, comprising:
   support beam means having a forward end portion and a rearward end portion;
   means connected to the forward end portion of the support beam means raising, lowering and supporting the forward end portion of the support beam means in predetermined positions thereof; and
   rearward beam elevation means connected to the support beam means generally between the forward and the rearward end portions thereof and having a portion engageable with the ground raising the rearward end portion of the support beam means in one position, and lowering the rearward end portion of the support beam means toward a ground engaging position in one other position, comprising: a ground engaging plate;
   a pivot shaft secured to the ground engaging plate;
   first hydraulic cylinder means comprising a pair of hydraulic cylinders, the bodies of said cylinders being rigidly interconnected having one end pivotally connected to the support beam means via a common pivot connection and the opposite end pivotally connected to the pivot shaft the first hydraulic cylinder means extending from the ground engaging plate in one direction; and
   second hydraulic cylinder means comprising a second pair of hydraulic cylinders, the bodies of said cylinders being ridigly interconnected, having one end pivotally connected to the support beam means via a common pivot connection and the opposite end pivotally connected to the pivot shaft, the first hydraulic cylinder means and the second hydraulic cylinder means each being connected to the ground engaging plate via a common pivot connection provided via the pivot shaft the second hydraulic cylinder means extending in a generally opposite direction from the ground engaging plate with respect to the first hydraulic cylinder means, the first and the second hydraulic cylinder means moving the ground engaging plate in one direction lowering the rearward end portion of the support beam means in one condition of the first and the second hydraulic cylinder means and moving the ground engaging plate in an opposite direction raising the rearward end portion of the support beam means in an actuated position of the first and the second hydraulic cylinder means.

2. Trailer apparatus, comprising:

support beam means having a forward end portion and a rearward end portion;

means connected to the forward end portion of the support beam means raising, lowering and supporting the forward end portion of the support beam means in predetermined actuated positions thereof; and rearward beam elevational means connected to the support beam means generally between the forward and the rearward end portions thereof and having a portion engageable with the ground raising the rearward end portion of the support beam means in one actuated position, and lowering the rearward end portion of the support beam means toward a ground engaging position in one other actuated position;

road dolly means removably connectable to the support beam means generally near the rearward end portion of the support beam means, rollingly supporting the rearward end portion of the support beam means when connected thereto in a transport position of the trailer apparatus, comprising:

a support base, having a forward end and a rearward end;

a first dolly axle connected to the support base generally near the forward end thereof;

a second dolly axle connected to the support base generally near the rearward end thereof;

forward wheel means connected to the first dolly axle rollingly supporting a portion of the road dolly means, the forward wheel means being pivotable about a steering axis generally transverse to the first dolly axle;

rearward wheel means connected to the second dolly axle cooperating with the forward wheel means to rollingly support the road dolly means, the rearward wheel means being pivotable about a steering axis generally transverse to the second dolly axle;

wheel steering means connected to and steeringly pivoting the forward and the rearward wheel means in one position for steeringly moving the road dolly means;

a forward shaft member, having opposite ends, connected to the forward end portion of the support base;

a rearward shaft member, having opposite ends, connected to the rearward end portion of the support base; and a plurality of support extension members, one of the support extension members telescopingly connected to each end of each of the forward and the rearward shaft members, each support extension member having a surface supportingly engaging a portion of the support beam means in a transport position of the trailer apparatus and each support extension member being telescopingly movable in an outwardly and an inwardly direction with respect to the end of the shaft member connected thereto to adjustingly vary the support width of the road dolly means.

3. Trailer apparatus, comprising:

support beam means having a forward end portion and a rearward end portion;

means connected to the forward end portion of the support beam means raising, lowering and supporting the forward end portion of the support beam means in predetermined actuated positions thereof; and rearward beam elevation means connected to the support beam means generally between the forward end and the rearward end portions thereof and having a portion engageable with the ground raising the rearward end portion of the support beam means in one actuated position, and lowering the rearward portion of the support beam means toward a ground engaging position in one other actuation position, comprising:

a ground engaging plate;

first hydraulic cylinder means pivotally connected to the support beam means;

second hydraulic cylinder means pivotally connected to the support beam means;

means pivotally connecting the first hydraulic cylinder means and the second hydraulic cylinder means to the ground engaging plate, the second hydraulic cylinder means extending in a generally opposite direction from the ground engaging plate with respect to the first hydraulic cylinder means, the first and the second hydraulic cylinder means moving the ground engaging plate in one direction raising the rearward end portion of the support beam means and moving the ground engaging plate in an opposite direction lowering the rearward end portion of the support beam means in actuated positions of the first and the second hydraulic cylinder means;

cable means having one end secured to the ground engaging plate; and lifting hydraulic cylinder means supported via the support beam means, having a portion connected to the end of the cable means generally opposite the end of the cable means connected to the ground engaging plate, the lifting hydraulic cylinder means pulling the ground engaging plate in a direction lowering the rearward end portion of the support beam means in one position of the lifting hydraulic cylinder means.

4. The apparatus of claim 3 wherein the support beam means includes: a pair of longitudinally extending support beams; and wherein the rearward beam elevation means includes: left rearward beam elevation means connected to one of the support beams; and a right rearward beam elevation means connected to the one other support beam, the left and the right rearward beam elevation means cooperating to raise and lower the rearward end portions of the pair of support beams.

5. The apparatus of claim 3 wherein the first hydraulic cylinder means includes: more than one hydraulic cylinder, each hydraulic cylinder pivotally connected to the support beam means and the ground engaging means; and means securedly connecting each hydraulic cylinder of the first hydraulic cylinder means; and wherein the second hydraulic cylinder means includes: more than one hydraulic cylinder, each hydraulic cylinder pivotally connected to the support beam means and the ground engaging means; and means securedly connecting each hydraulic cylinder of the second hydraulic cylinder means.

6. The apparatus of claim 3 wherein the lifting hydraulic cylinder means is supported on the support beam means to apply a force in a direction generally transverse to the moving directions of the ground engaging plate and wherein the apparatus includes: pulley means rollingly engaging the cable means between the lifting hydraulic cylinder means and the ground engaging plate translating the force applied via the lifting hydraulic cylinder means to a direction generally parallel to the moving directions of the ground engaging plate.

7. The apparatus of claim 3 wherein the lifting hydraulic cylinder means and the cable means are each located to orient the cable means to apply a lifting force in a plane generally parallel to the planar disposition of the forces applied via the first and the second hydraulic cylinder means.

8. The apparatus of claim 3 defined further to include:
road dolly means removably connectable to the support beam means generally near the rearward end portion of the support beam means, rollingly supporting the rearward end portion of the support beam means when connected thereto in a transport position of the trailer apparatus. l 9. The apparatus of claim 8 wherein the rearward beam elevation means is spaced a distance from the rearward end of the support beam means generally toward the forward end portion of the support beam means; and wherein the means raising, lowering and supporting the forward end portion of the support beam means is defined further as lowering the forward end portion of the support beam means pivotally raising the rearward end portion of the support beam means between the rearward beam elevation means and the rearward end of the support beam means to a predetermined elevation providing sufficient clearance for inserting the road dolly means generally beneath the support beam means, the rearward end portion of the support beam means being pivotally raised about the rearward beam elevation means in an actuated raising position of the rearward beam elevation means.

10. The apparatus of claim 9 defined further to include:
plant dolly means removably connectable to the support beam means rollingly supporting the support beam means when connected thereto, the plant dolly means insertable beneath the support beam means in a transport position of the road dolly means.

11. The apparatus of claim 10 wherein the support beam means includes: a pair of longitudinally extending support beams; and wherein the plant dolly means is defined further to include: a pair of plant dolly assemblies, each plant dolly assembly removably connectable to one of the support beams rollingly supporting the support beam connected thereto; and wherein the apparatus is defined further to include: brace means pivotally connected to one of the support beams and movable to a position extending between the pair of support beams; and means for securing a portion of the brace means to the support beam, opposite the support beam pivotally connected to the brace means, the brace means spacing the pair of support beams generally near the rearward end portion of the support beam means.

12. The apparatus of claim 11 wherein each plant dolly assembly includes:
axle means;
wheel means journally supported on the axle means; and
means connected to the axle means connectable with the support means connecting each plant dolly assembly to one of the support beams, the plant dolly assemblies being spaced a distance apart in an assembled position of the plant dolly assemblies and the support beam means.

13. The apparatus of claim 8 wherein the road dolly means includes:
a support base, having a forward end and a rearward end;
a first dolly axle connected to the support base generally near the forward end thereof;
a second dolly axle connected to the support base generally near the rearward end thereof;
forward wheel means connected to the first dolly axle rollingly supporting a portion of the road dolly means, the forward wheel means being pivotable about a steering axis generally transverse to the first dolly axle;
rearward wheel means connected to the second dolly axle cooperating with the forward wheel means to rollingly support the road dolly means, the rearward wheel means being pivotable about a steering axis generally transverse to the second dolly axle; and
wheel steering means connected and steeringly pivoting the forward and the rearward wheel means in one position for steeringly moving the road dolly means.

14. The apparatus of claim 13 defined further to include:
rear steering remote controller connected to the wheel steering means actuating the wheel steering means for steeringly moving the road dolly means from a remote position.

15. The apparatus of claim 13 wherein the wheel steering means includes:
tie rod means connected to the forward and the rearward wheel means pivoting the forward and the rearward wheel means generally about the steering axis of each of the forward and the rearward wheel means in steering positions of the tie rod means; and
means connected to the tie rod means moving the tie rod means to predetermined steering positions in actuated positions thereof.

16. The apparatus of claim 15 wherein the tie rod means includes:
a forward tie rod pivotally connected to the forward wheel means;
a rearward tie rod pivotally connected to the rearward wheel means;

A left connecting rod pivotally connected to the forward and the rearward tie rods; and a right connecting rod pivotally connected to the forward and the rearward tie rods, the forward and the rearward tie rods and the left and the right connecting rods forming a parallelogram shape and synchronously moving the forward and the rearward wheel means in response to a steering force applied thereto.

17. The apparatus of claim 16 wherein the means connected to the tie rod means for moving the tie rod means includes:

steering cylinder means connected to the support base and to one of the pivotal connections between the forward and the rearward tie rods and the left and the right connecting rods applying a steering force to the tie rod means in actuated positions thereof.

18. The apparatus of claim 3 wherein the means raising, lowering and supporting the forward end portion of the support beam means is defined further to include:

connector beam means, having a forward and a rearward end portion;

a pivot axle connected to the rearward end portion of the connector beam means and the forward end portion of the support beam means pivotally connecting the forward end portion of the support beam means to the rearward end portion of the connector beam means for pivotal movement about a beam pivot axis defined via the pivot axle; and means connecting the rearward end portion of the connector beam means and the forward end portion of the support beam means raising and lowering the support beam means in actuated positions thereof.

19. The apparatus of claim 18 wherein the means connecting the rearward end portion of the connector beam means and the forward end portion of the support beam means is defined further as maintaining an adjustable relationship therebetween, said means adjustable in one position lowering the forward end portion of the support beam means and adjustable in one other position raising the forward end portion of the support beam means.

20. The apparatus of claim 19 wherein the beam pivot axis is spaced a distance from the rearward end of the connector beam means and the means maintaining the adjustable relationship between the support beam means and the connector beam means is spaced generally near the rearward end of the connector beam means and between the beam pivot axis and the rearward end of the connector beam means.

21. The apparatus of claim 20 wherein the support beam means includes: a pair of support beams, each support beam having a forward and a rearward end portion; and a pair of angle bars, each angle bar connected to the forward end of one of the support beams and extending angularly therefrom, the end of each of the angle bars, opposite the ends connected to the support bars, being pivotally connected to the connector beam means via the pivot axle forming the pivotal connection between the connector beam means and the support beam means, the angle bars spacing the support beams a distance below the forward end portion of the connector beam means.

22. The apparatus of claim 21 defined further to include: a brace member rigidly secured to the forward end portions of the support beams; and wherein the means raising, lowering and supporting the forward end portion of the support beam means includes: elevation hydraulic cylinder means pivotally connected to the rearward end portion of the connector beam means and connected to the brace member.

23. The apparatus of claim 18 wherein the trailer apparatus is connectable to the tiltable fifth wheel assembly of a tractor, the trailer apparatus being defined further to include:

fifth wheel connector means connected to the forward end portion of the connector beam means and removably securing the trailer apparatus to the fifth wheel assembly of a tractor, the connector beam means being tiltable about the fifth wheel assembly when connected thereto.

24. The apparatus of claim 18 defined further to include: slide means having a slide chamber formed through a portion thereof; and wherein the forward end portion of the connector beam means is slidingly disposed in a portion of the slide chamber for lateral movement therein; and wherein the apparatus is defined further to include: beam lateral adjust means connected to the slide means and to the forward end portion of the connector beam means laterally moving the connector beam means in actuated positions of the beam lateral adjust assembly.

25. The apparatus of claim 3 wherein the means raising, lowering and supporting the forward end portion of the support beam means is defined further to include:

connector beam means, having a forward and a rearward end portion;

housing means connected to the rearward end portion of the connector beam means having an opening means extending through a portion thereof;

slide beam means, having one end secured to the forward end portion of the support beam means, the slide beam means extending a distance from the support beam means and having a portion slidingly disposed through a portion of the opening means of the housing means; and means connected to the housing means and the slide beam means raising and lowering the slide beam means in actuated positions thereof.

26. The apparatus of claim 25 wherein the slide beam means includes channels formed therein and wherein the means raising and lowering the slide beam means includes: lifting hydraulic cylinder means connected to the housing means and the slide beam means and disposed within a portion of the channels formed in the slide beam means, the lifting hydraulic cylinder means raising and lowering the slide beam means in actuated positions thereof.

27. Trailer apparatus, comprising:

support beam means having a rearward end portion and a rearward end portion road dolly means removably connectable to the support beam means generally near the rearward end portion of the support beam means, rollingly supporting the rearward end portion of the support beam means when connected thereto in a transport position of the trailer apparatus;

means connected to the forward end portion of the support beam means raising, lowering and supporting the forward end portion of the support beam means in predetermined positions thereof;

rearward beam elevation means connected to the support beam means generally between the forward and the rearward end portion thereof, the rearward beam elevation means being spaced a distance from the rearward end of the support beam means generally toward the forward end portion of the support beam means, the rearward beam elevation means having a portion engageable with the ground raising the rearward end portion of the support beam means in one position and lowering the rearward end portion of the support beam means toward a ground engaging position in one other position, the rearward end portion of the support beam means between the rearward beam elevation means and the rearward end of the support beam means being pivotally raised about the rearward beam elevation means in the raised position of the support beam means via the rearward beam elevation means while lowering the forward end portion of the support beam means via the means raising, lowering and supporting the forward end portion of the support beam means, the rearward end portion of the support beam means being pivotally raised about the rearward beam elevation means to a predetermined elevation providing sufficient clearance for inserting the road dolly means generally beneath the support beam means, the rearward beam elevation means comprising:

a ground engaging plate;

first hydraulic cylinder means pivotally connected to the support beam means;

second hydraulic cylinder means pivotally connected to the support beam means; and means pivotally connecting the first hydraulic cylinder means and the second hydraulic cylinder means to the ground engaging plate via a common pivot connection, the second hydraulic cylinder means extending in a generally opposite direction from the ground engaging plate with respect to the first hydraulic cylinder means, the first and the second hydraulic cylinder means moving the ground engaging plate in one direction raising the rearward end portion of the support beam means and moving the ground engaging plate in an opposite direction lowering the rearward end portion of the support beam means in actuated positions of the first and the second hydraulic cylinder means; and plant dolly means removably connectable to the support beam means rollingly supporting the support beam means when connected thereto, the plant dolly means insertable beneath the support beam means in a transport position of the road dolly means and including a portion engageable with the ground engaging plate of the rearward beam elevation means securedly connecting the plant dolly means to the support beam means, the rearward beam elevation means raising and lowering the support beam means relative to the plant dolly means when connected thereto.

28. The apparatus of claim 27 wherein a portion of the plant dolly means engageable with the ground engaging portion of the rearward beam elevation means includes means engageable with a portion of the ground engaging means for aligning the plant dolly means in a predetermined position with respect to the rearward beam elevation means and the support beam means.

* * * * *